(12) United States Patent
Asai

(10) Patent No.: US 9,210,375 B2
(45) Date of Patent: Dec. 8, 2015

(54) TRANSMISSION SYSTEM AND TRANSMITTING METHOD

(75) Inventor: Takahiro Asai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 594 days.

(21) Appl. No.: 13/580,600

(22) PCT Filed: Feb. 24, 2011

(86) PCT No.: PCT/JP2011/054830
§ 371 (c)(1),
(2), (4) Date: Aug. 22, 2012

(87) PCT Pub. No.: WO2011/105621
PCT Pub. Date: Sep. 1, 2011

(65) Prior Publication Data
US 2012/0314019 A1 Dec. 13, 2012

(30) Foreign Application Priority Data

Feb. 24, 2010 (JP) .................................. 2010-038665
Jan. 5, 2011 (JP) .................................. 2011-000561

(51) Int. Cl.
*H04N 7/14* (2006.01)
*H04N 7/15* (2006.01)
(Continued)

(52) U.S. Cl.
CPC ................. *H04N 7/15* (2013.01); *H04N 7/152* (2013.01); *H04N 21/234327* (2013.01); *H04N 21/4788* (2013.01); *H04N 21/64792* (2013.01); *G06F 15/16* (2013.01)

(58) Field of Classification Search
CPC ........... H04N 7/14; H04N 7/15; H04N 7/152; H04N 7/147; H04N 7/148; H04N 7/157; H04N 7/155

USPC .................... 348/14.12, 14.01–14.09, E5.091, 348/E7.078; 455/450, 550.1, 566, 557, 561, 455/563; 709/219, 226, 223, 230–235
See application file for complete search history.

(56) References Cited

U.S. PATENT DOCUMENTS 7,836,200 B2 * 11/2010 Ishii et al. ..................... 709/233
2005/0025074 A1 2/2005 Hiim et al.
(Continued)

FOREIGN PATENT DOCUMENTS

CN         1893666 A     1/2007
CN       101568026 A    10/2009
(Continued)

OTHER PUBLICATIONS

Canadian Office Action issued Apr. 7, 2014 in Patent Application No. 2,790,740.
(Continued)

*Primary Examiner* — Sunita Joshi
(74) *Attorney, Agent, or Firm* — Oblon, McClelland, Maier & Neustadt, L.L.P.

(57) ABSTRACT

A transmission system that transmits and receives base data, which is necessary for reproducing image and audio, and extended data, which is used for improving quality of the image and the audio, via a communication network between transmission terminals is provided, The transmission system includes: a base-data relay system that includes: a plurality of base-data relaying units for relaying the base data transmitted from a source transmission terminal among the transmission terminals to a destination transmission terminal among the transmission terminals; and a selecting unit that selects one base-data relaying unit from among the base-data relaying units for each communication between transmission terminals; and an extended-data relay system that includes: an extended-data relaying unit for relaying the extended-data transmitted from the source transmission terminal to the destination transmission terminal.

11 Claims, 16 Drawing Sheets

(51) Int. Cl.
*H04N 21/2343* (2011.01)
*H04N 21/4788* (2011.01)
*H04N 21/647* (2011.01)
*G06F 15/16* (2006.01)

(56) References Cited

U.S. PATENT DOCUMENTS

| | | |
|---|---|---|
| 2007/0009039 A1 | 1/2007 | Ryu |
| 2008/0159186 A1 | 7/2008 | Steer |
| 2008/0239062 A1* | 10/2008 | Civanlar et al. ............ 348/14.09 |
| 2009/0051962 A1 | 2/2009 | Asai et al. |
| 2010/0088408 A1 | 4/2010 | Asai et al. |
| 2010/0131670 A1 | 5/2010 | Ishii et al. |

FOREIGN PATENT DOCUMENTS

| | | |
|---|---|---|
| JP | 2006-081086 | 3/2006 |
| JP | 2007-020187 | 1/2007 |
| JP | 2007-300498 | 11/2007 |
| JP | 2008-227577 | 9/2008 |
| JP | 2009-508454 | 2/2009 |
| JP | 2009-054139 | 3/2009 |
| JP | 2010-114881 | 5/2010 |
| RU | 2 303 335 C2 | 7/2007 |
| WO | WO 03/003639 A2 | 1/2003 |
| WO | WO 2005/004482 A1 | 1/2005 |
| WO | WO2008/060262 A1 | 5/2008 |
| WO | WO 2009/081576 A1 | 7/2009 |

OTHER PUBLICATIONS

International Search Report issued Mar. 29, 2011 in PCT/JP2011/054830 filed Feb. 24, 2011.

Office Action and Search Report issued on Oct. 29, 2014 in the corresponding Chinese Patent Application No. 201180020445.0 (with English Translation).

Notice of Allowance issued Dec. 4, 2014 in Russian Patent Application No. 2012140435 (with English language translation).

* cited by examiner

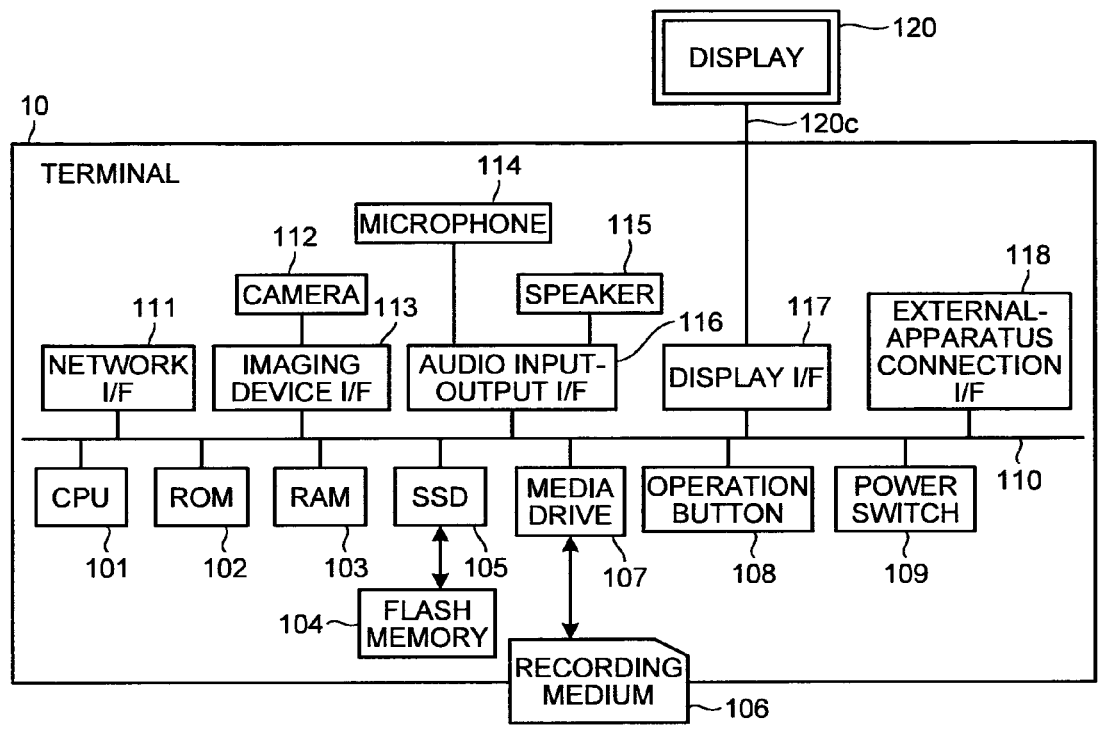
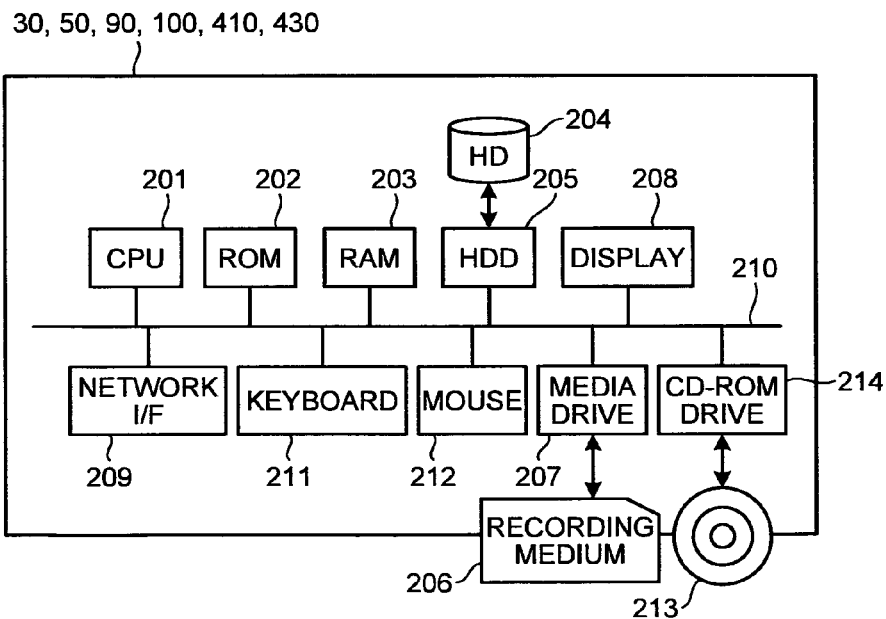

FIG.7

CONNECTION-NUMBER MANAGEMENT TABLE

| IP ADDRESS OF BASE-DATA RELAY APPARATUS | CONNECTION NUMBER |
|---|---|
| 1.4.2.2 | 4 |
| 1.4.2.3 | 2 |
| ... | ... |

FIG.8

CHANGED-QUALITY MANAGEMENT TABLE

| IP ADDRESS OF RELAY DESTINATION OF EXTENDED DATA | IMAGE QUALITY OF IMAGE DATA TO BE RELAYED (EXTENDED DATA TO BE RELAYED) |
|---|---|
| 1.3.2.4 | HIGH IMAGE QUALITY (EXTENDED DATA 1, EXTENDED DATA 2) |
| 1.3.1.3 | LOW IMAGE QUALITY (NONE) |
| 1.3.2.3 | MEDIUM IMAGE QUALITY (EXTENDED DATA 1) |
| ... | ... |

FIG.9

EXTENDED-DATA RELAY APPARATUS MANAGEMENT TABLE

| ID OF EXTENDED-DATA RELAY APPARATUS | OPERATING STATE | RECEPTION DATE AND TIME | IP ADDRESS OF EXTENDED-DATA RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.10

TERMINAL-AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.11

TERMINAL MANAGEMENT TABLE

| TERMINAL ID | OPERATING STATE | RECEPTION DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.12

DESTINATION-LIST MANAGEMENT TABLE

| ID OF REQUEST SOURCE TERMINAL | ID OF DESTINATION TERMINAL |
|---|---|
| 01aa | 01ab, 01ba, 01db |
| 01ab | 01aa, 01ba, 01ca |
| 01ba | 01aa, 01ab, 01cb, 01da |
| ... | ... |
| 01db | 01aa, 01ab, 01da |

FIG.13

SESSION MANAGEMENT TABLE

| SELECTION SESSION ID | ID OF EXTENDED-DATA RELAY APPARATUS | ID OF REQUEST SOURCE TERMINAL | ID OF DESTINATION TERMINAL | EXTENDED-DATA DELAY TIME (ms) | RECEPTION DATE AND TIME OF EXTENDED-DATA DELAY INFORMATION |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.14

ADDRESS-PRIORITY MANAGEMENT TABLE

| COINCIDENCE OF DOT ADDRESSES | ADDRESS PRIORITY |
|---|---|
| SAME. SAME. SAME. DIFFERENT | 5 |
| SAME. SAME. DIFFERENT.- | 3 |
| SAME. DIFFERENT.- .- | 1 |
| DIFFERENT.- .- .- | 0 |

FIG.15

TRANSMISSION-RATE-PRIORITY MANAGEMENT TABLE

| MAXIMUM DATA TRANSMISSION RATE OF EXTENDED-DATA RELAY APPARATUS (Mbps) | TRANSMISSION-RATE PRIORITY |
|---|---|
| EQUAL TO OR GREATER THAN 1000 | 5 |
| EQUAL TO OR GREATER THAN 100 AND SMALLER THAN 1000 | 3 |
| EQUAL TO OR GREATER THAN 10 AND SMALLER THAN 100 | 1 |
| SMALLER THAN 10 | 0 |

FIG.16

QUALITY MANAGEMENT TABLE

| EXTENDED-DATA DELAY TIME (ms) | QUALITY OF IMAGE DATA (EXTENDED DATA TO BE RELAYED) |
|---|---|
| EQUAL TO OR GREATER THAN 0 AND SMALLER THAN 100 | HIGH IMAGE QUALITY (EXTENDED DATA 1, EXTENDED DATA 2) |
| EQUAL TO OR GREATER THAN 100 AND SMALLER THAN 300 | MEDIUM IMAGE QUALITY (EXTENDED DATA 1) |
| EQUAL TO OR GREATER THAN 300 | LOW IMAGE QUALITY (NONE) |

FIG.17

BASE-DATA RELAY SYSTEM MANAGEMENT TABLE

| BASE-DATA RELAY SYSTEM ID | IP ADDRESS OF SELECTING APPARATUS |
|---|---|
| 222a | 1.4.1.1 |

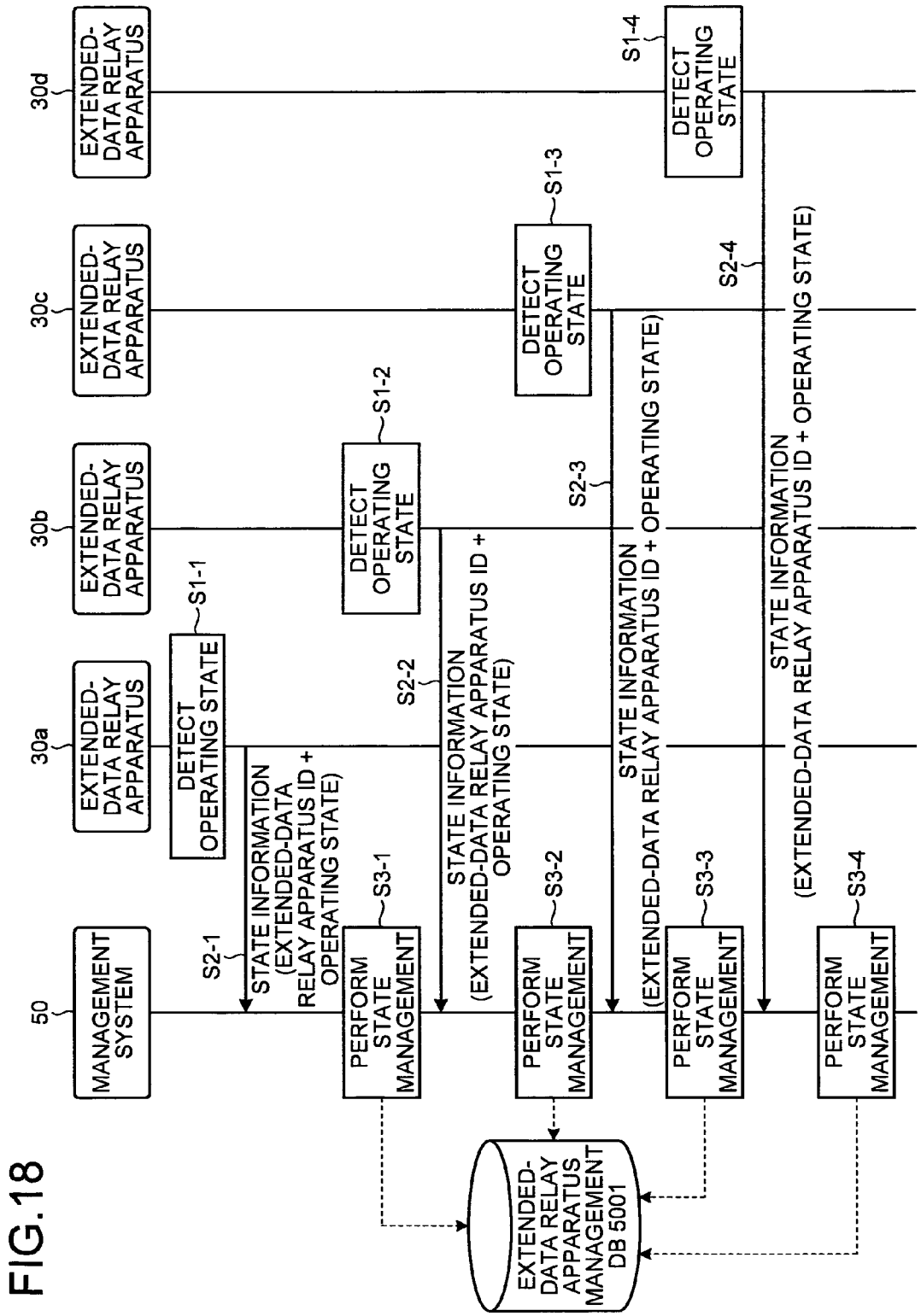

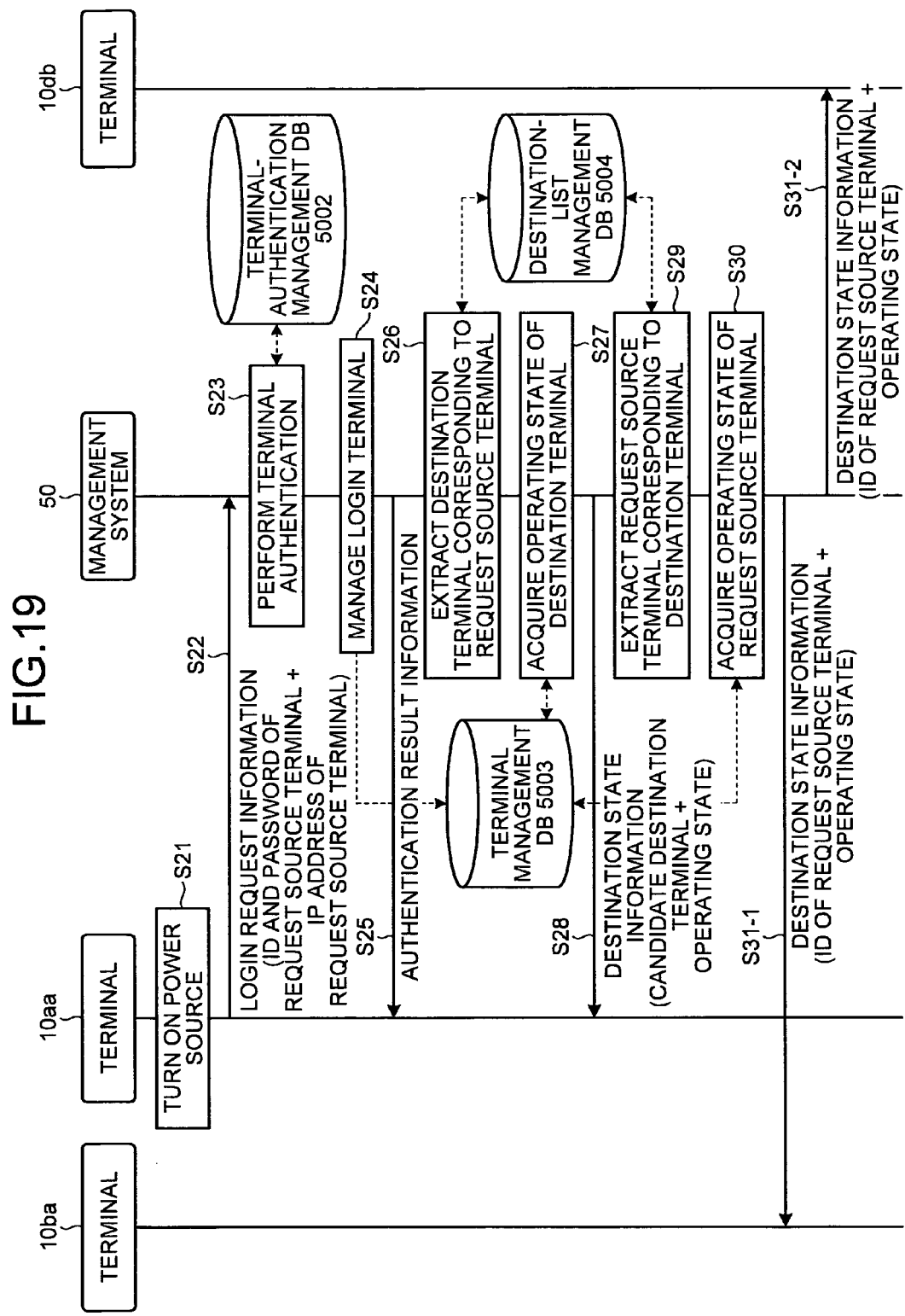

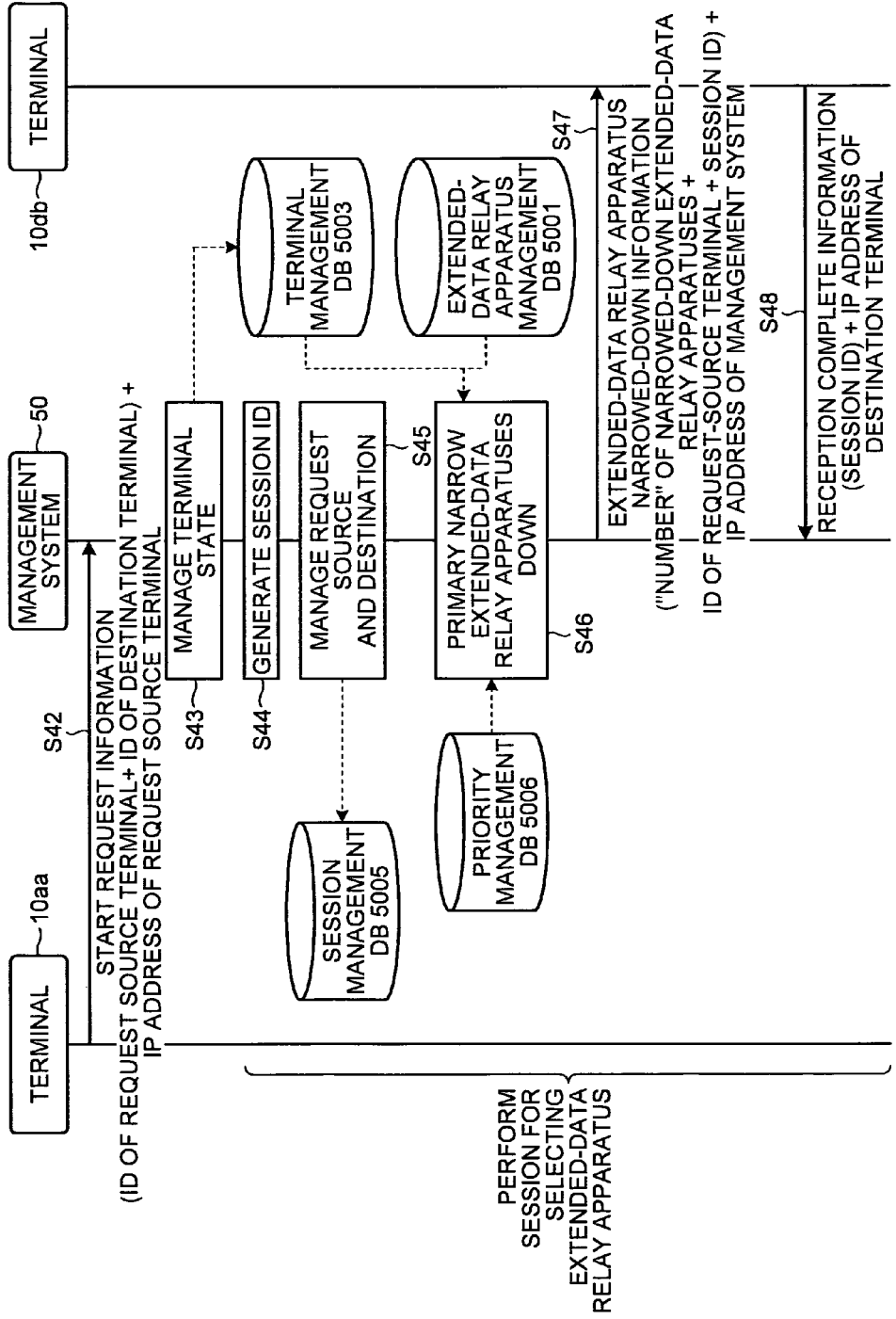

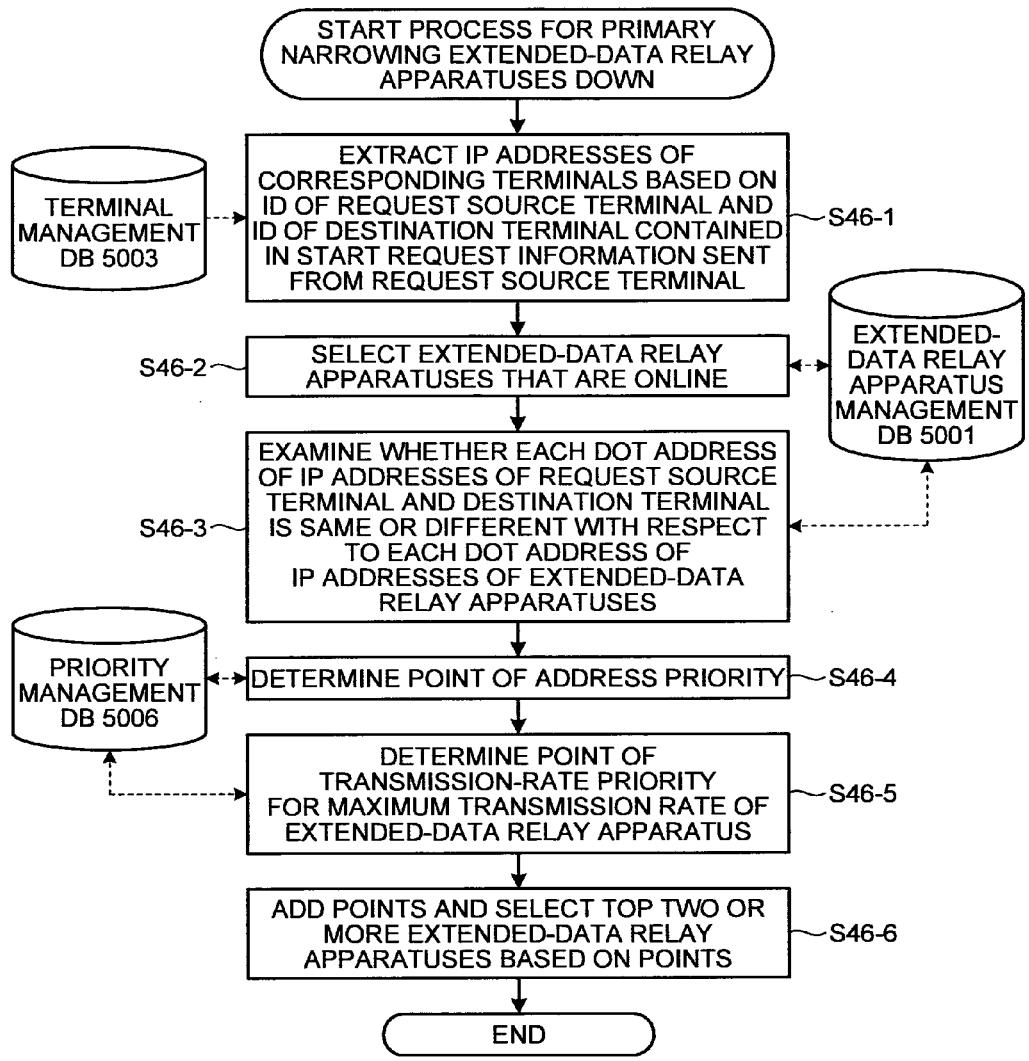

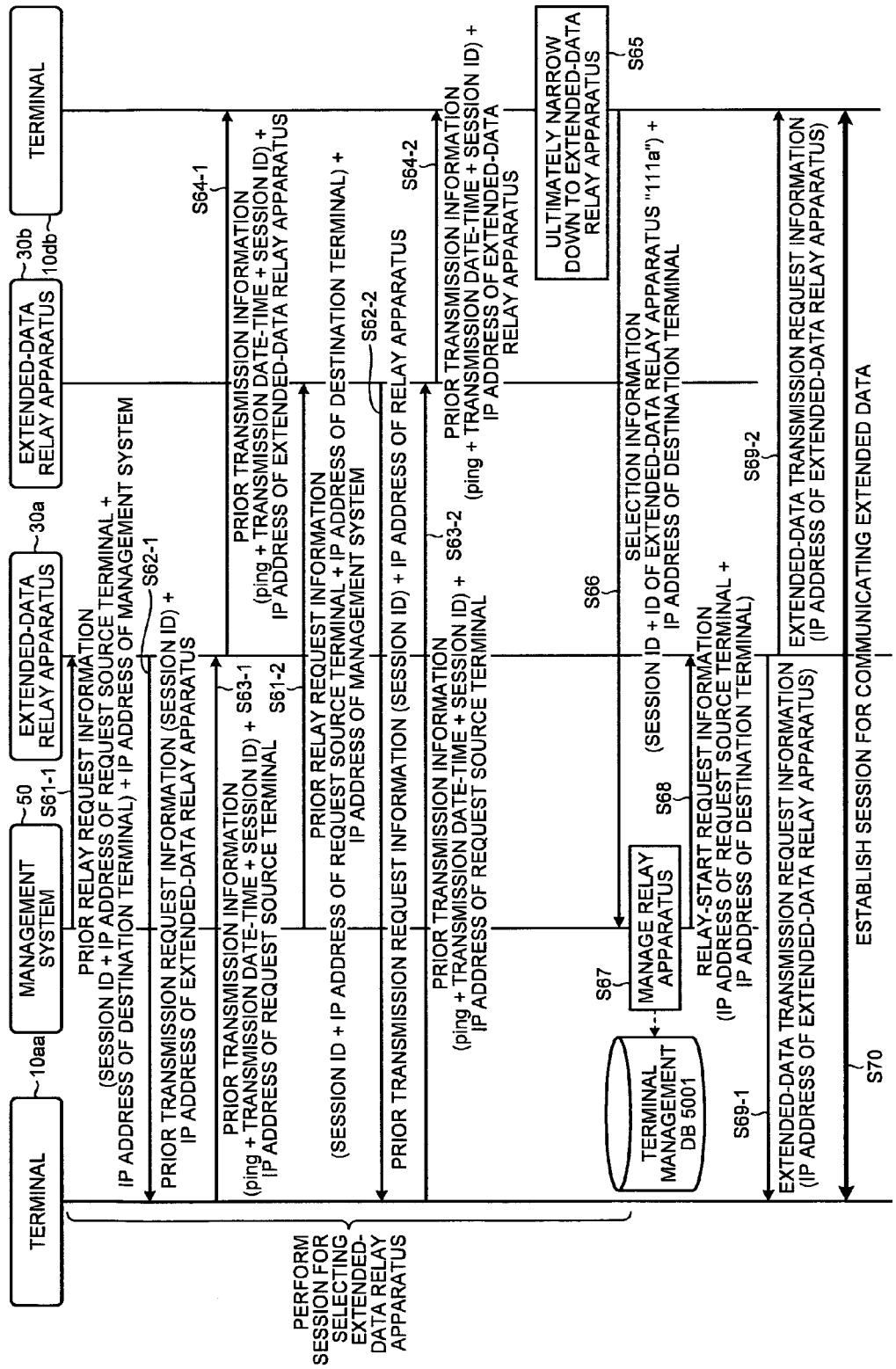

TRANSMISSION SYSTEM AND TRANSMITTING METHOD

TECHNICAL FIELD

The present invention relates to a transmission system that relays at least one of image data and audio data by a relay apparatus or a relay system to perform communication between transmission terminals.

BACKGROUND ART

In recent years, with increase in demand for reducing expenses or time for business trips, transmission systems such as teleconference systems for performing a teleconference over a communication network such as the Internet have been widespread. In such transmission systems, a teleconference can be realized by transmitting and receiving image data and audio data between a plurality of transmission terminals. With recent advances in broadband environment, it is possible to transmit and receive image data of high image quality and audio data of high audio quality. Therefore, it is possible to easily recognize states of other persons in a teleconference, enabling to enhance conversational communications.

In recent transmission systems, relay apparatuses that relay image data and audio data between transmission terminals such as teleconference terminals are installed for each LAN (Local Area Network) in a communication network. These relay apparatuses can reduce loads on each relay apparatus by distributing communication processing for a teleconference, and can distribute data transmission amounts of image data and audio data to be relayed.

Conventionally, when one relay apparatus is selected for use from a plurality of relay apparatuses, a relay apparatus is generally used that is connected to the same LAN as teleconference terminals that perform a teleconference. More specifically, by selecting a relay apparatus with an IP address close to the IP addresses of the transmission terminals, it is possible to transmit and receive image data of high image quality and audio data of high audio quality via the selected relay apparatus (see Japanese Patent Application Laid-open No. 2008-227577).

Conventionally, when a video signal is transmitted to a destination terminal, the video signal is encoded into data for a base layer and data for an enhancement layer; and each data is transmitted by different channels via a relay server. In this case, the data for the base layer is transmitted by a high-reliable channel and the data for the enhancement layer is transmitted by a low-reliable channel. Therefore, even when the data for the enhancement layer cannot be transmitted, the destination terminal can reproduce video by using the data for the base layer (see Japanese Patent Application Laid-open No. 2009-508454).

However, in the teleconference systems, when a relay apparatus with an IP address close to IP addresses of teleconference terminals is used, loads may be concentrated on a specific relay apparatus depending on communication states. More specifically, when use frequency of a teleconference terminal in a local area in the network increases, use frequency of a relay apparatus installed in the same area increases. When a load applied to the relay apparatus exceeds an allowable amount, a failure occurs in the relay apparatus and image data and audio data cannot be transmitted and received, which is a problem.

Conventionally, it is necessary to use a specific relay server for transmitting data for a base layer and data for an enhancement layer, which are communicated between a plurality of terminals. That is, the amount of data to be processed by a specific relay server extremely increases. Therefore, when a load applied to the relay server exceeds an allowable amount, a failure occurs in the relay server, and image data and audio data cannot be transmitted and received, which is a problem.

DISCLOSURE OF INVENTION

According to an aspect of the present invention, there is provided a transmission system that transmits and receives base data, which is necessary for reproducing image and audio, and extended data, which is used for improving quality of the image and the audio, via a communication network between transmission terminals, the transmission system including: a base-data relay system that includes: a plurality of base-data relaying units for relaying the base data transmitted from a source transmission terminal among the transmission terminals to a destination transmission terminal among the transmission terminals; and a selecting unit that selects one base-data relaying unit from among the base-data relaying units for each communication between transmission terminals; and an extended-data relay system that includes: an extended-data relaying unit for relaying the extended-data transmitted from the source transmission terminal to the destination transmission terminal.

BRIEF DESCRIPTION OF DRAWINGS

FIG. 2 is a hardware configuration diagram of a transmission terminal according to the embodiment;

FIG. 3 is a hardware configuration diagram of a transmission management system, a relay apparatus, and a program providing server according to the embodiment;

FIG. 7 is a schematic diagram of a connection-number management table;

FIG. 8 is a schematic diagram of a changed-quality management table;

FIG. 9 is a schematic diagram of a relay-apparatus management table;

FIG. 10 is a schematic diagram of a terminal-authentication management table;

FIG. 11 is a schematic diagram of a terminal management table;

FIG. 12 is a schematic diagram of a destination-list management table;

FIG. 13 is a schematic diagram of a session management table;

FIG. 14 is a schematic diagram of an address-priority management table;

FIG. 15 is a schematic diagram of a transmission-rate-priority management table;

FIG. 16 is a schematic diagram of a quality management table;

FIG. 17 is a schematic diagram of a base-data relay system management table;

FIG. 18 is a sequence diagram of a process for managing state information indicating an operating state of each relay apparatus;

FIG. 19 is a sequence diagram of a preparatory process for starting communication between transmission terminals;

FIG. 20 is a sequence diagram of a process for narrowing relay apparatuses down;

FIG. 21 is a flow diagram of a process for narrowing relay apparatuses down;

FIG. 22 is a diagram illustrating calculation of points of priority for performing the process for narrowing relay apparatuses down;

FIG. 23 is a sequence diagram of a process for selecting a relay apparatus by a transmission terminal;

BEST MODE(S) FOR CARRYING OUT THE INVENTION

Entire Configuration According to Embodiments

Figure 1:
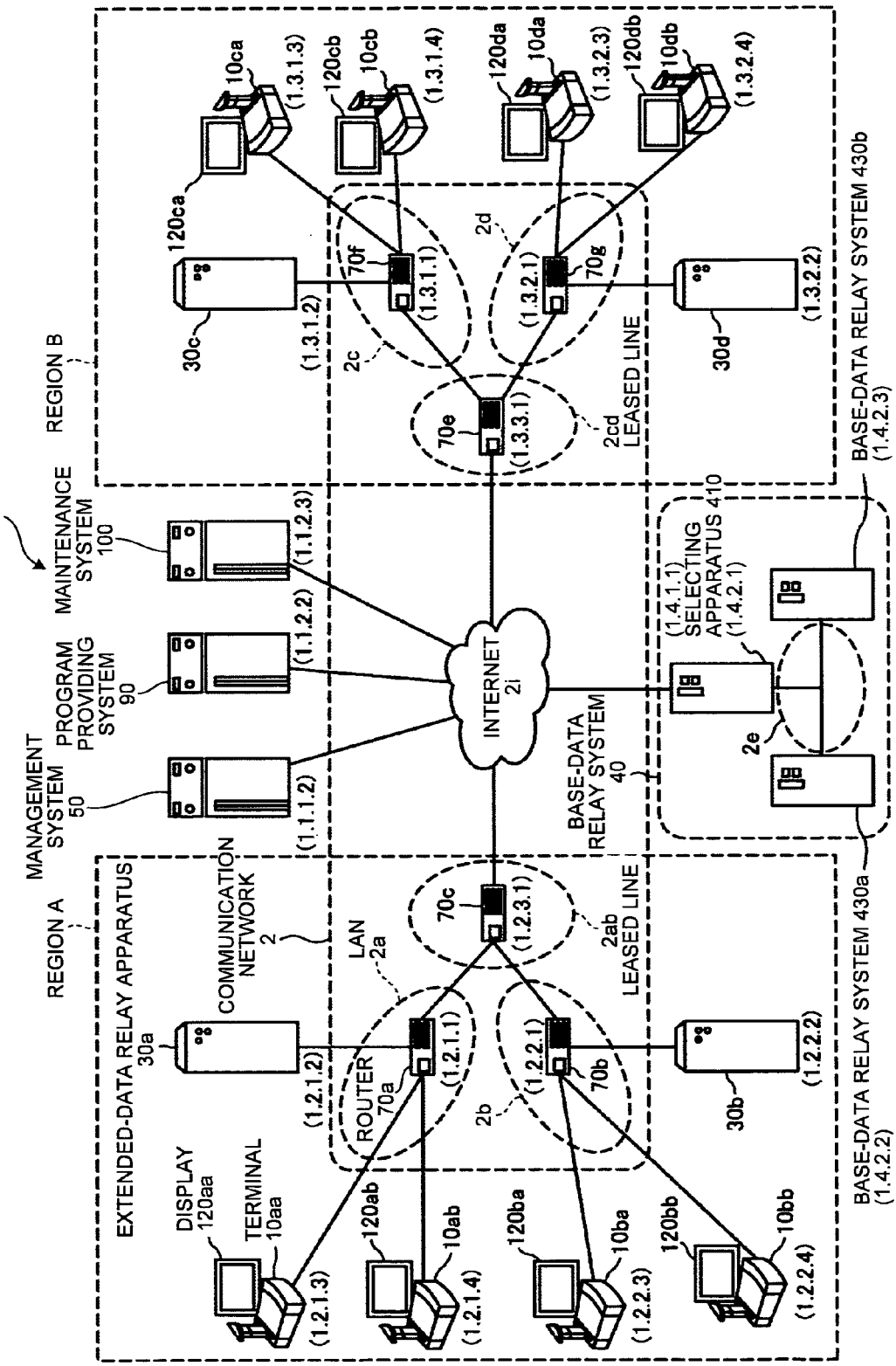
FIG. 1 is a schematic diagram of a transmission system according to an embodiment.

Exemplary embodiments of the present invention will be described below with reference to FIGS. 1 to 27. FIG. 1 is a schematic diagram of a transmission system 1 according to an embodiment. The outline of the embodiment will be described with reference to FIG. 1.

The transmission system includes a data providing system for transmitting contents data in one direction from one transmission terminal to another transmission terminal via a transmission management system, and includes a communication system for mutually exchanging information, emotion, or the like between a plurality of transmission terminals via a transmission management system. The communication system is a system for mutually exchanging information, emotion, or the like between a plurality of communication terminals (corresponding to the "transmission terminals") via a communication management system (corresponding to the "transmission management system"). Examples of the communication system include a teleconference system, a video telephony system, an audio conference system, an audio telephony system, and a PC (Personal Computer)-screen share system.

In the embodiment, explanation will be given of a transmission system, a transmission management system, and a communication terminal on the assumption that a teleconference system is used as an example of the communication system, a teleconference management system is used as an example of the communication management system, and a teleconference terminal is used as an example of the communication terminal. That is, the transmission terminal and the transmission management system of the present invention may be applied not only to the teleconference system but also to the communication system and the transmission system.

The transmission system 1 shown in FIG. 1 includes a plurality of transmission terminals (10aa, 10ab, ..., 10db), displays (120aa, 120ab, ..., 120db) for the respective transmission terminals (10aa, 10ab, ..., 10db), a base-data relay system 40 including a plurality of base-data relay apparatuses (430a, 430b) and a selecting apparatus 410, a plurality of extended-data relay apparatuses (30a, 30b, 30c, 30d), a transmission management system 50, a program providing system 90, and a maintenance system 100.

The terminals 10 perform transmission for transmitting and receiving image data and audio data, which are examples of contents data. In the following, a "transmission terminal" is simply described as a "terminal", and a "transmission management system" is simply described as a "management system". In the embodiment, an arbitrary terminal among the terminals (10aa, 10ab, ..., 10db) is described as "terminal 10", an arbitrary display among the displays (120aa, 120ab, ..., 120db) is described as "display 120", an arbitrary base-data relay apparatus among the base-data relay apparatuses (430a, 430b) is described as "base-data relay apparatus 430", and an arbitrary extended-data relay apparatus among the extended-data relay apparatuses (30a, 30b, 30c, 30d) is described as "extended-data relay apparatus 30".

The terminal 10 performs communication of image data, audio data, or the like with the other terminals 10. In the embodiment, an example will be described in which an image of the image data is a moving image. However, the image may be a still image instead of the moving image. Further, the image of the image data may contain both of a moving image and a still image. The base-data relay apparatus 430 of the base-data relay system 40 relays base data, which is generated based on at least one of image data and audio data and needed for reproducing image or audio, between the terminals 10. The selecting apparatus 410 of the base-data relay system 40 selects a base-data relay apparatus to be used for relaying the base data from among the base-data relay apparatuses 430 for each communication between terminals. The extended-data relay apparatus 30 relays extended data, which is used for improving the quality of image or audio, between the terminals 10. The management system 50 integrally manages the terminals 10, the base-data relay system 40, and the extended-data relay apparatuses 30.

A plurality of routers (70a, 70b, ..., 70g) shown in FIG. 1 selects an optimal route for image data or audio data. In the embodiment, an arbitrary router among the routers (70a, 70b, ..., 70g) is described as "router 70".

The program providing system 90 includes a HD (Hard Disk) (not shown) that stores therein a terminal program for causing the terminals 10 to implement various functions or various means, and that can transmit the terminal program to the terminals 10. The HD of the program providing system 90 also stores therein a selecting-apparatus program and a base-data-relay-apparatus program for causing the base-data relay system 40 to implement various functions or various means, so that these programs can be transmitted to each apparatus of the base-data relay system 40. The HD of the program providing system 90 also stores therein an extended-data-relay-apparatus program for causing the extended-data relay apparatuses 30 to implement various functions or various means, so that the extended-data-relay-apparatus program can be transmitted to the extended-data relay apparatuses 30. The HD of the program providing system 90 also stores therein a transmission management program for causing the management system 50 to implement various functions or various means, so that the transmission management program can be transmitted to the management system 50.

The maintenance system 100 is a computer that performs conservation, management, or maintenance on at least one of the terminals 10, the extended-data relay apparatuses 30, the base-data relay system 40, the management system 50, and the program providing system 90. For example, when the maintenance system 100 is installed in one country; and the terminals 10, the extended-data relay apparatuses 30, the base-data relay system 40, the management system 50, and the program providing system 90 are installed in a foreign country, the maintenance system 100 remotely performs maintenance, such as conservation, management, or repair, on at least one of the terminals 10, the extended-data relay apparatuses 30, the base-data relay system 40, the management system 50, and the program providing system 90, via a communication network 2. The maintenance system 100 also performs maintenance, such as management of a model number, a manufacturing number, sale destination, maintenance and check, or a failure history, on at least one of the terminals 10, the extended-data relay apparatuses 30, the base-data relay system 40, the management system 50, and the program providing system 90, without using the communication network 2.

The terminal 10aa, the terminal 10ab, the extended-data relay apparatus 30a, and the router 70a are communicably connected to each other via a LAN 2a. The terminal 10ba, the terminal 10bb, the extended-data relay apparatus 30b, and the router 70b are communicably connected to each other via a LAN 2b. The LAN 2a and the LAN 2b are communicably connected to each other with a leased line 2ab including the router 70c, and are established in a predetermined region A. For example, the region A is Japan, the LAN 2a is established in an office in Tokyo, and the LAN 2b is established in an office in Osaka.

The terminal 10ca, the terminal 10cb, the extended-data relay apparatus 30c, and the router 70f are communicably connected to each other via a LAN 2c. The terminal 10da, the terminal 10db, the extended-data relay apparatus 30d, and the router 70g are communicably connected to each other via a LAN 2d. The LAN 2c and the LAN 2d are communicably connected to each other with a leased line 2cd including the router 70e, and are established in a predetermined region B. For example, the region B is the United States of America, the LAN 2c is established in an office in New York, and the LAN 2d is established in an office in Washington D.C. The region A and the region B are communicably connected to each other through the routers (70c, 70e) over an Internet 2i.

In the embodiment, the communication network 2 of the embodiment is formed of the LAN 2a, the LAN 2b, the leased line 2ab, the Internet 2i, the leased line 2cd, the LAN 2c, and the LAN 2d.

The selecting apparatus 410, the base-data relay apparatus 430a, and the base-data relay apparatus 430b of the base-data relay system 40 are communicably connected to each other via a LAN 2e. The base-data relay system 40 is communicably connected to the terminals 10 via the communication network 2. The base-data relay system 40 may be installed in the region A, the region B, or a region other than the regions A and B. However, the base-data relay system 40 is preferably installed in a region other than the regions A and B so as not to be affected by communication traffic in a local area in the region A and the region B.

The management system 50 and the program providing system 90 are communicably connected to the terminals 10, the base-data relay system 40, and the extended-data relay apparatuses 30 via the Internet 2i. The management system 50 and the program providing system 90 may be installed in the region A, the region B, or a region other than the regions A and B.

In FIG. 1, four-part numbers shown above or below the terminals 10, the selecting apparatus 410, the base-data relay apparatuses 430, the extended-data relay apparatuses 30, the management system 50, the routers 70, the program providing system 90, and the maintenance system 100 represent simplified IP addresses in general IPv4. For example, an IP address of the terminal 10aa is "1.2.1.3". It is possible to employ IPv6 instead of IPv4. However, explanation will be given below with use of IPv4 for simplicity of the explanation.

In FIG. 1, two IP addresses are provided for the selecting apparatus 410. This means that the selecting apparatus has an IP address (1.4.1.1.) for communicating with the terminals 10, the management system 50, and the program providing system 90; and an IP address (1.4.2.1) for communicating with the base-data relay apparatuses 430. Therefore, the terminals 10 and the management system 50 can perform communication by regarding the base-data relay system 40 having a plurality of base-data relay apparatuses as one "base-data relay apparatus". In FIG. 1, each of the routers 70 has an IP address for communicating with terminals, apparatuses, and systems in the network and an IP address for communicating with terminals, apparatuses, and systems outside of the network. However, the IP address for communicating with the terminals outside of the network (WAN (Wide Area Network) side) is not shown in the figure.

Hardware Configuration of the Embodiment:

A hardware configuration of the embodiment will be described. In the embodiment, an explanation will be given of a case in which, when delay occurs in receiving image data by the terminal 10 as a relay destination, the extended-data relay apparatus 30 changes the resolution of an image of the image data and then transmits the image data to the terminal 10 as the relay destination.

Figure 27:
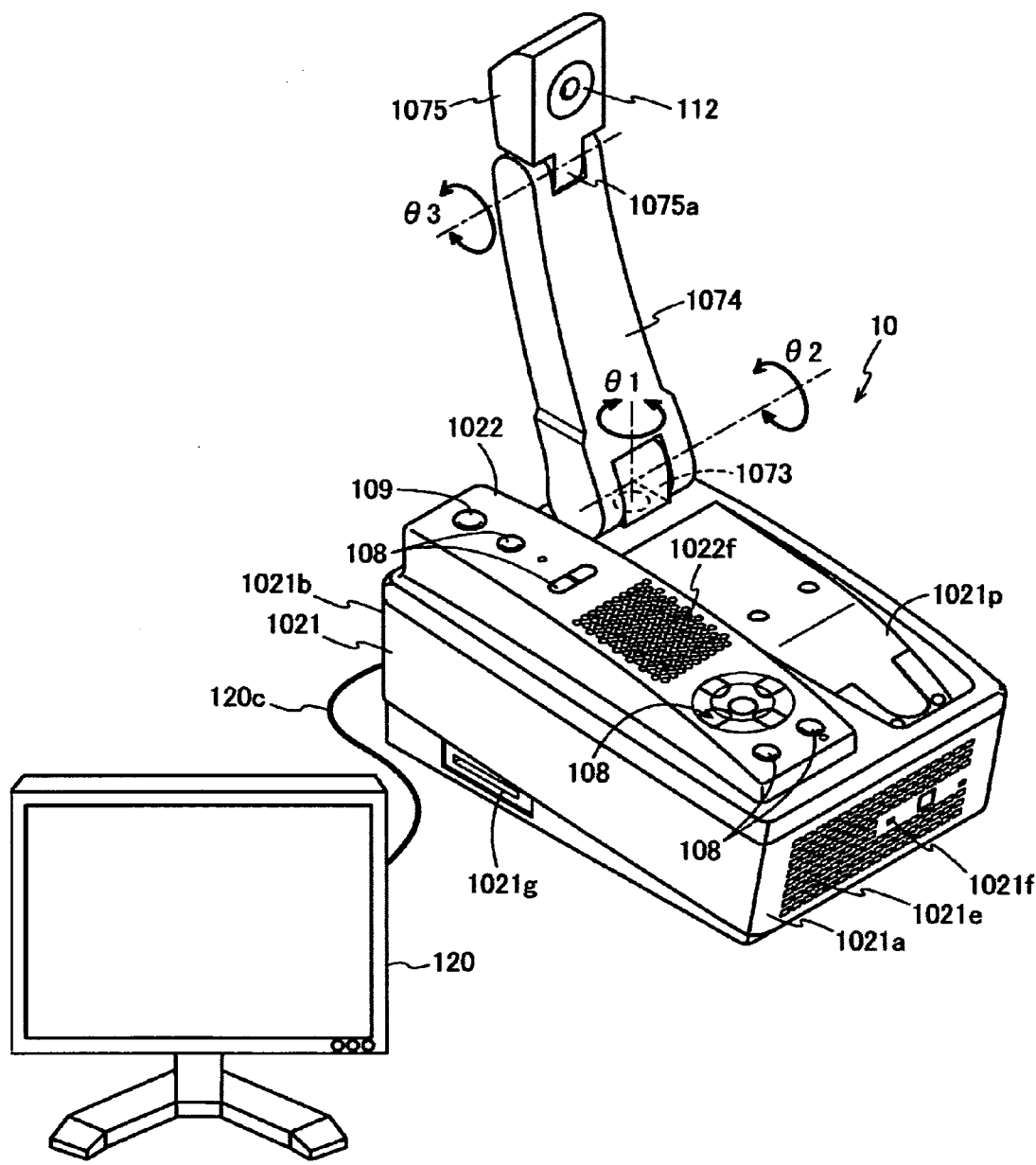
FIG. 27 is an external view of a terminal according to the embodiment.

FIG. 27 is an external view of a terminal according to the embodiment. As shown in FIG. 27, the terminal 10 includes a casing 1021, an arm 1074, and a camera housing 1075. A plurality of air inlet holes 1021e are formed on approximately the whole area of a front wall 1021a of the casing 1021, and a plurality of air outlet holes (not shown) are formed on approximately the whole area of a back wall 1021b of the casing 1021. Therefore, air in front of the terminal 10 is introduced via the air inlet holes 1021e, and is discharged behind the terminal 10 via the air outlet holes, along with drive of a cooling fan installed in the casing 1021. A sound pickup hole 1021f is formed in the center of the front wall 1021a so that sounds such as audio, desired/undesired sounds, or noise can be picked up by a built-in microphone 114 to be described below. A connection port 1021g corresponding to a hardware I/F for connecting a cable terminal of an external apparatus (an external camera, an external microphone, or an external speaker) is formed on a lower side surface of the casing 1021.

An operation panel 1022 is formed on a top left side of the casing 1021. On the operation panel 1022, operation buttons 108, a power switch 109, and audio outlet holes 1022f for transmitting output sounds from a built-in speaker 115 are formed, each of which will be described in detail below. A housing portion 1021p as a concave portion for housing the arm 1074 and the camera housing 1075 is formed on a top right side of the casing 1021.

The arm 1074 is mounted on the casing 1021 via a torque hinge 1073. The arm 1074 is structured to rotate horizontally and vertically with respect to the casing 1021 in a range of a pan angle θ1 of ±180° and in a range of a tilt angle θ2 of 90° (click feeling is given when the arm is tilted by about 45°) assuming that the angles are at 0° at the front face.

A built-in camera 112 to be described below is arranged in the camera housing 1075, so that it is possible to photograph a user, a room, or the like. A torque hinge 1075a is formed in the camera housing 1075. The camera housing 1075 is mounted on the arm 1074 via the torque hinge 1075a. The camera housing 1075 is structured to rotate in a range of a tilt angle θ3 from about 100° toward the front side of the terminal 10 to about 90° toward a rear side of the terminal 10 assuming that the angle is at 0° in the state in which the camera housing 1075 is linearly arranged with respect to the arm 1074.

The external appearances of the extended-data relay apparatuses 30, the base-data relay system 40, the management system 50, the program providing system 90, and the maintenance system 100 are the same as the external appearance of a general server or computer, so that explanation thereof is not given.

FIG. 2 is a hardware configuration diagram of the terminal 10 according to the embodiment. As shown in FIG. 2, the terminal 10 of the embodiment includes a CPU (Central Processing Unit) 101 that controls the whole operation of the terminal 10, a ROM (Read Only Memory) 102 that stores therein the terminal program, a RAM (Random Access Memory) 103 used as a work area of the CPU 101, a flash memory 104 for storing various data such as image data or audio data, an SSD (Solid State Drive) 105 that controls read and write of various data with respect to the flash memory 104 according to the control by the CPU 101, a media drive 107 that controls read and write (storage) of data with respect to a recording medium 106 such as a flash memory, the operation button 108 to be operated for, for example, selecting a destination from the terminal 10, the power switch 109 for switching ON/OFF of a power source of the terminal 10, and a network I/F 111 for transmitting data using the communication network 2 to be described below.

The terminal 10 further includes the built-in camera 112 that picks up an image of an object and obtains image data according to the control by the CPU 101, an imaging device I/F 113 that controls drive of the camera 112, the built-in microphone 114 that inputs audio, the built-in speaker 115 that outputs audio, an audio input-output I/F 116 for processing input and output of audio signals between the microphone 114 and the speaker 115 according to the control by the CPU 101, a display I/F 117 for transmitting image data to the external display 120 according to the control by the CPU 101, an external-apparatus connection I/F 118 for connecting various external apparatuses attached to the connection port 1021g shown in FIG. 27, and a bus line 110 such as an address bus or a data bus for electrically connecting the above components as shown in FIG. 2.

The display 120 is a display unit formed of liquid crystal or organic EL for displaying an image of an object or an operation icon. The display 120 is connected to the display I/F 117 via a cable 120c. The cable 120c may be a cable for an analog RGB (VGA) signal, a component video cable, or a cable for a HDMI (High-Definition Multimedia Interface) signal or a DVI (Digital Video Interactive) signal.

The camera 112 includes a lens and a solid-state image sensing device that converts light into electric charge to computerize an image (video) of an object. As the solid-state image sensing device, a CMOS (Complementary Metal Oxide Semiconductor) or a CCD (Charge Coupled Device) may be used.

An external apparatus, such as an external camera, an external microphone, or an external speaker, is connectable to the external-apparatus connection I/F 118 via a USB (Universal Serial bus) cable or the like. When an external camera is connected, the external camera is driven prior to the built-in camera 112 according to the control by the CPU 101. Similarly, when an external microphone or an external speaker is connected, the external microphone or the external speaker is driven prior to the built-in microphone 114 or the built-in speaker 115 according to the control by the CPU 101.

The recording medium 106 is removable with respect to the terminals 10. Any nonvolatile memories, such as an EEPROM (Electrically Erasable and Programmable ROM), that read and write data according to the control by the CPU 101 can be used instead of the flash memory 104.

The terminal program described above may be distributed by being recorded in a computer-readable recording medium, such as the recording medium 106, in an installable or executable file format.

FIG. 3 is a hardware configuration diagram of a management system according to the embodiment. The management system 50 includes: a CPU 201 that controls the whole operation of the management system 50, a ROM 202 that stores therein the transmission management program, a RAM 203 used as a work area of the CPU 201, a HD (hard Disk) 204 for storing various data, a HDD (Hard Disk Drive) 205 that controls read and write of data with respect to the HD 204 according to the control by the CPU 201, a media drive 207 that controls read and write (storage) of data with respect to a recording medium 206 such as a flash memory, a display 208 that displays various information such as cursor, menu, window, characters, or images, a network I/F 209 for transmitting data by using the communication network 2 to be described below, a keyboard 211 having a plurality of keys for inputting characters, numerals, or various instructions, a mouse 212 for selecting or executing various instructions, selecting a processing target, or moving cursor, a CD-ROM drive 214 that controls read and write of data with respect to a CD-ROM (Compact Disc Read Only Memory) 213, which is an example of a removable recording medium, and a bus line 210 such as an address bus or a data bus for electrically connecting the above components as shown in FIG. 3.

The transmission management program described above may be distributed by being recorded in a computer-readable recording medium, such as the recording medium 206 or the CD-ROM 213, in an installable or executable file format.

The selecting apparatus 410 has the same hardware configuration as the management system 50 described above, and therefore, the same explanation is not repeated.

However, the selecting-apparatus program for controlling the selecting apparatus 410 is recorded in the ROM 202. In this case, the selecting-apparatus program may be distributed by being recorded in a computer-readable recording medium, such as the recording medium 206 or the CD-ROM 213, in an installable or executable file format.

The base-data relay apparatus 430 has the same hardware configuration as the management system 50, and therefore, the same explanation is not repeated. However, the base-data-relay-apparatus program for controlling the base-data relay apparatus 430 is recorded in the ROM 202. In this case, the base-data relay apparatus program may be distributed by being recorded in a computer-readable recording medium, such as the recording medium 206 or the CD-ROM 213, in an installable or executable file format.

The extended-data relay apparatus 30 has the same hardware configuration as the management system 50, and therefore, the same explanation is not repeated. However, the extended-data-relay-apparatus program for controlling the extended-data relay apparatus 30 is recorded in the ROM 202. In this case, the extended-data-relay-apparatus program may be distributed by being recorded in a computer-readable recording medium, such as the recording medium 206 or the CD-ROM 213, in an installable or executable file format.

The program providing system 90 has the same hardware configuration as the management system 50, and therefore, the same explanation is not repeated. However, a program-providing program for controlling the program providing system 90 is recorded in the ROM 202. In this case, the program providing program may be distributed by being recorded in a computer-readable recording medium, such as the recording medium 206 or the CD-ROM 213, in an installable or executable file format.

The maintenance system 100 has the same hardware configuration as the management system 50, and therefore, the same explanation is not repeated. However, a maintenance program for controlling the maintenance system 100 is recorded in the ROM 202. In this case, the maintenance program may be distributed by being recorded in a computer-readable recording medium, such as the recording medium 206 or the CD-ROM 213, in an installable or executable file format.

As another example of the removable recording medium, a computer-readable recording medium such as a CD-R (Compact Disc Recordable), a DVD (Digital Versatile Disk), or a Blu-ray Disk may be used for recording and distributing the programs.

Functional Configuration of the Embodiment

Figure 4:
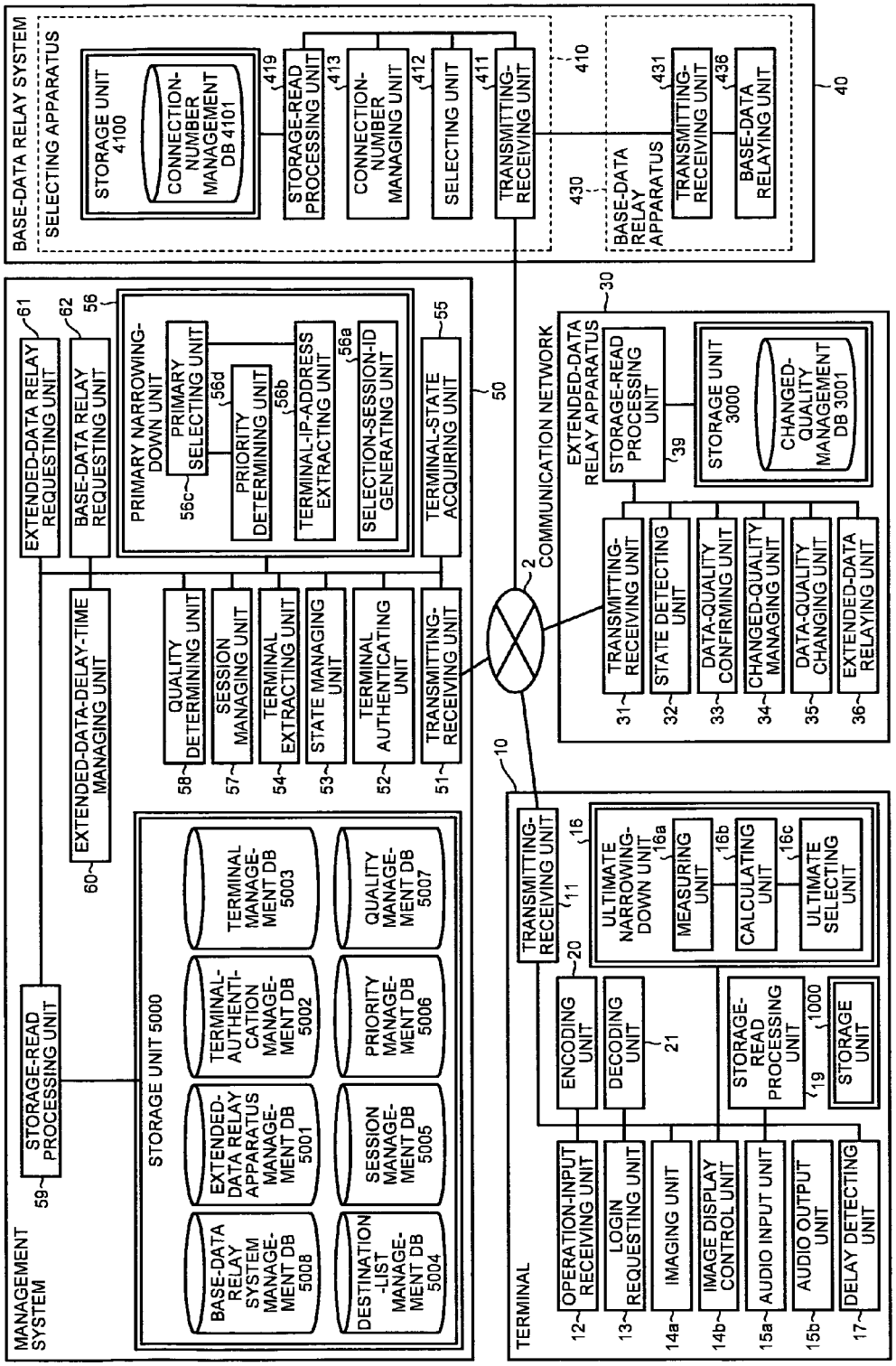
FIG. 4 is a functional block diagram of a terminal, apparatuses, and systems that form the transmission system according to the embodiment.

A functional configuration of the embodiment will be described. FIG. 4 is a functional block diagram of a terminal, apparatuses, and systems that form the transmission system 1 according to the embodiment. In FIG. 4, the terminal 10, the base-data relay system 40, the extended-data relay apparatus 30, and the management system 50 are connected to each other such that they can perform data communication via the communication network 2. Because the program providing system 90 shown in FIG. 1 is not directly related to teleconference communication, it is not shown in FIG. 4.

Functional Configuration of the Terminal

The terminal 10 includes a transmitting-receiving unit 11, an operation-input receiving unit 12, a login requesting unit 13, an imaging unit 14a, an image display control unit 14b, an audio input unit 15a, an audio output unit 15b, an ultimate narrowing-down unit 16, a delay detecting unit 17, a storage-read processing unit 19, an encoding unit 20, and a decoding unit 21. Each unit is a function or a means implemented by driving any of the components shown in FIG. 2 in response to a command that the CPU 201 has issued according to the program stored in the ROM 202. The terminal 10 includes a storage unit 1000 formed of the SSD 105 shown in FIG. 2.

Each Functional Unit of the Terminal

Each functional unit of the terminal will be described in detail below. The transmitting-receiving unit 11 of the terminal 10 is implemented by the network I/F 111 shown in FIG. 2, and performs transmission and reception of various data (information) with other terminals, apparatuses, and systems via the communication network 2. The operation-input receiving unit 12 is implemented by the operation button 108 and the power switch 109 shown in FIG. 2, and receives various inputs from a user. For example, when a user turns on the power switch 109 shown in FIG. 2, the operation-input receiving unit 12 shown in FIG. 4 receives input of power-ON, and turns on a power source.

The login requesting unit 13 is implemented by a command from the CPU 101 shown in FIG. 2. Upon reception of the input of power-ON, the login requesting unit 13 automatically transmits login request information indicating a request for login and a current IP address of the request source terminal 10, from the transmitting-receiving unit 11 to the management system 50 via the communication network 2. When a user changes the state of the operation button 108 from ON to OFF, the transmitting-receiving unit 11 transmits state information for turning off the power source or state information indicating offline to the management system 50, and thereafter, the operation-input receiving unit 12 completely turns off the power source. Therefore, the management system 50 can recognize that the state of the terminal 10 is changed from power-ON to power-OFF.

The imaging unit 14a is implemented by a command from the CPU 101 shown in FIG. 2, as well as the camera 112 and the imaging device I/F 113 shown in FIG. 2. The imaging unit 14a picks up an image of an object and outputs image data of the image. The image display control unit 14b is implemented by the display I/F 117 shown in FIG. 2, and performs control for transmitting image data to the external display 120.

The audio input unit 15a is implemented by a command from the CPU 101 shown in FIG. 2, as well as the audio input-output I/F 116 shown in FIG. 2. Once voice of a user is converted into an audio signal by the microphone 114, the audio input unit 15a outputs audio data of the audio signal. The audio output unit 15b is implemented by a command from the CPU 101 shown in FIG. 2, as well as the audio input-output I/F 116 shown in FIG. 2. The audio output unit 15b outputs an audio signal of audio data to a speaker, and the speaker 115 outputs the audio.

The ultimate narrowing-down unit 16 implements a measuring unit 16a, a calculating unit 16b, and an ultimate selecting unit 16c in response to a command from the CPU 101 shown in FIG. 2 in order to perform an ultimate narrowing-down process for narrowing the extended-data relay apparatuses 30 down to one extended-data relay apparatus 30.

The measuring unit 16a measures reception date and time at which the transmitting-receiving unit 11 has received prior transmission information, which will be described later, every time the transmitting-receiving unit 11 receives the prior transmission information. The calculating unit 16b calculates time needed from transmission to reception of the prior transmission information based on a difference between the measured reception date and time and transmission date and time contained in the prior transmission information, for each prior transmission information for which the measuring unit 16a has measured reception date and time. The ultimate selecting unit 16c selects the extended-data relay apparatus 30 to which the prior transmission information is relayed in the shortest needed time of any needed time calculated by the calculating unit 16b, so that one extended-data relay apparatus is ultimately selected.

The delay detecting unit 17 is implemented by a command from the CPU 101 shown in FIG. 2, and detects extended-data delay time (ms (milliseconds)) of extended data that is transmitted from another terminal 10 via the extended-data relay apparatus 30.

The storage-read processing unit 19 is implemented by a command from the CPU 101 shown in FIG. 2, as well as the SSD 105 shown in FIG. 2. The storage-read processing unit 19 performs processing of storing various data in the storage unit 1000 and reading various data stored in the storage unit 1000. The storage unit 1000 stores therein a terminal ID (Identification) and a password for identifying the terminal 10, image data, audio data, and the like. Image data or audio data received along with a telephone call with a destination terminal is written over data in the storage unit 1000 every time the image data or the audio data is received. An image of the image data before overwriting is displayed on the display 120 and audio of the audio data before overwriting is output from a speaker 150.

The terminal ID and an extended-data relay apparatus ID, which will be described below, indicate identification information, such as language, characters, symbols, or various marks, used for identifying the terminal 10 and the extended-data relay apparatus 30, respectively. The terminal ID and the extended-data relay apparatus ID may be identification information formed of a combination of at least two of language, characters, symbols, and various marks.

The encoding unit 20 is implemented by a command from the CPU 101 shown in FIG. 2, and encodes at least one of image data output from the imaging unit 14a and audio data output from the audio input unit 15a by a predetermined method (performs conversion so that data can be returned to original (or similar) data). The encoding is performed by, for example, causing the encoding unit 20 to perform processing in response to a command from the CPU 101 according to a codec (a program that allows data encoding and data decoding to be performed bi-directionally by using an encoding system) stored in the storage unit 1000 of the terminal 10.

As the encoding system for encoding video data among image data, an encoding system standardized by MPEG (moving Picture Experts Group) and an encoding system recommended by International Telecommunications Union Telecommunication Standardization Sector are known. Examples of the encoding system include MPEG-4 and H.264/annex G (hereinafter, described as H.264/SVC (Scalable Video Coding)). As an encoding system for compressing audio data, an encoding system standardized by MPEG and an encoding system recommended by International Telecommunications Union Telecommunication Standardization Sector are known. Examples of the encoding system include AAC and G.729. As an encoding system for compressing static image data among image data, GIF (Graphics Interchange Format), JPEG (Joint Photographic Experts Group), PNG (Portable Network Graphics), and the like are known.

The encoding unit 20 encodes at least one of image data and audio data into; base data necessary for reproducing video or audio; and extended data necessary for reproducing high-quality video or high-quality audio in combination with the base data. In this case, the encoding unit 20 can use any encoding systems that can separately encode data into the base data and the extended data. Examples of the encoding system for image data (video data) include H.264/SVC recommended by International Telecommunications Union Telecommunication Standardization Sector. The extended data is data necessary for reproducing high-quality video or high-quality audio, so that when image data or audio data is encoded, the amount of the extended data is generally greater than the amount of the base data.

The decoding unit 21 is implemented by a command from the CPU 101 shown in FIG. 2, and returns encoded data to decoded data (original or similar data) by a predetermined method. For example, the decoding is performed by causing the decoding unit 21 to perform processing in response to a command from the CPU 101 according to a codec stored in the storage unit 1000 of the terminal 10. As the codec, a codec corresponding to the encoding system that the encoding unit 20 has used for encoding is used.

Figure 5:
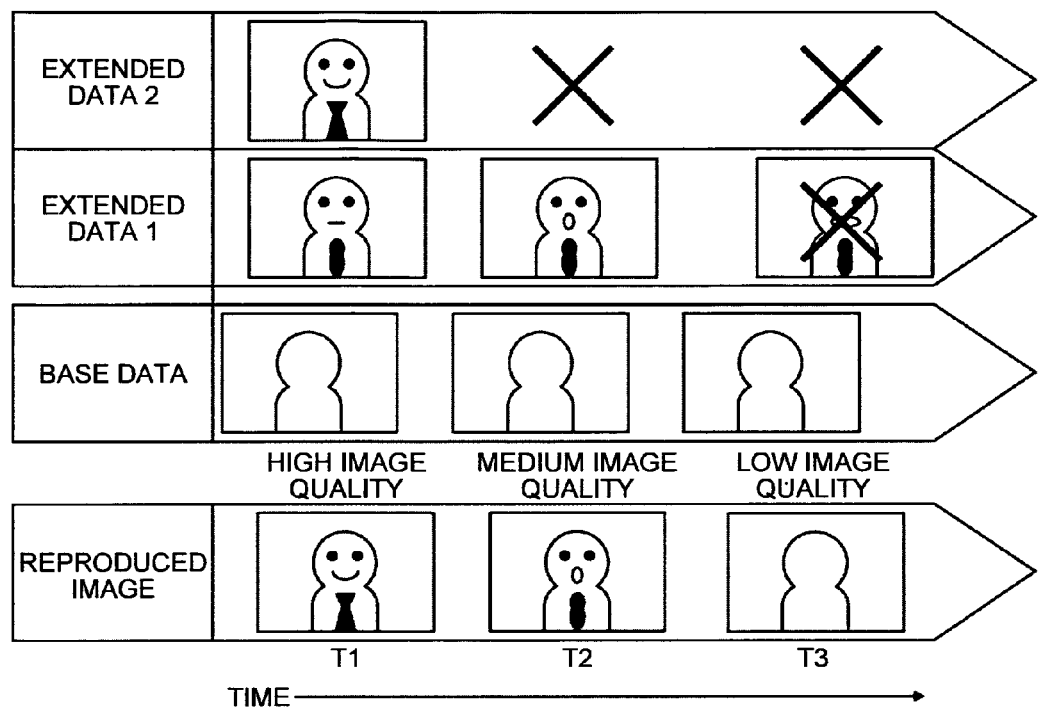
FIG. 5 is a schematic diagram illustrating a relation between data encoded with a codec of H.264/SVC and a reproduced image.

A detailed example of the processing for decoding data encoded by the codec of H.264/SVC will be described below with reference to a schematic diagram of FIG. 5, which illustrates a relation between data encoded by the codec of H.264/SVC and a reproduced image. In FIG. 5, image data is encoded into a single piece of base data and two pieces of extended data (extended data 1 and extended data 2). The base data is relayed by the base-data relay apparatus 430 and received by the transmitting-receiving unit 11 of the terminal 10. The two pieces of the extended data are relayed by the extended-data relay apparatus 30 and received by the transmitting-receiving unit 11 of the terminal 10.

When the terminal 10 receives the extended data 1 and the extended data 2 corresponding to the base data (the extended data are generated together with the base data by encoding image data at a certain time point) within a predetermined time after reception of the base data, the decoding unit 21 decodes the base data, the extended data 1, and the extended data 2. In this case, the image display control unit 14b displays an image of high resolution based on the decoded image data (see the reproduced image at time T1 of FIG. 5). When the terminal 10 receives only the extended data 1 corresponding to the base data within a predetermined time after reception of the base data, the decoding unit 21 decodes the base data and the extended data 1. In this case, the image display control unit 14b displays an image of medium resolution based on the decoded image data (see the reproduced image at time T2 of FIG. 5). When the terminal 10 cannot receive the extended data corresponding to the base data within a predetermined time after reception of the base data, the decoding unit 21 decodes the base data. In this case, the image display control unit 14b displays an image of low resolution based on the decoded image data (see the reproduced image at time T3 of FIG. 5).

Entire Configuration of the Base-Data Relay System

The base-data relay system 40 shown in FIG. 1 includes the selecting apparatus 410 and a plurality of base-data relay apparatuses (430a and 430b) that is communicably connected to the selecting apparatus 410 via the LAN 2e. The base-data relay apparatuses 430 relay the base data between the terminals 10. The selecting apparatus 410 selects a base-data relay apparatus used for relaying base data from among the base-data relay apparatuses 430 connected to the selecting apparatus 410 every time communication is performed between terminals. In the embodiment, the base data is data necessary for reproducing image or audio, so that the base-data relay apparatus 430 for relaying the base data needs to have high availability (in this example, it means that the apparatus is less likely to go down). Therefore, the selecting apparatus 410 selects the base-data relay apparatus 430 for relaying the base data for each session for communicating the base data between the terminals 10 in order to distribute a load applied to the base-data relay apparatus 430 and improve the availability. Besides, when the base-data relay apparatus 430 cannot relay the base data due to a failure or the like, the selecting apparatus 410 selects a new base-data relay apparatus 430 for relaying the base data in order to enhance the availability. The selecting apparatus 410 may be a load distributing apparatus (also referred to as a load balancer) or may include general functions (a session maintaining function, a failure monitoring function, a continuous service function, and the like) that the load distributing apparatus has.

Functional Configuration of the Selecting Apparatus

The selecting apparatus 410 of the base-data relay system 40 includes a transmitting-receiving unit 411, a selecting unit 412, and a storage-read processing unit 419. Each unit is a function or a means implemented by driving any of the components shown in FIG. 3 in response to a command that the CPU 201 has issued according to the program stored in the ROM 202. The selecting apparatus 410 further includes a storage unit 4100 formed of the HD 204 shown in FIG. 3.

Connection-Number Management Table

A connection-number management DB 4101 formed of a connection-number management table as shown in FIG. 7 is constructed in the storage unit 4100. In the connection-number management table, base-data relay apparatus identification information, which is used for identifying the base-data relay apparatus 430 connected to the selecting apparatus 410, and a connection number, which is the number of terminals that transmit base data to the base-data relay apparatus, are managed in an associated manner. As the base-data relay apparatus identification information, any information for identifying the base-data relay apparatus 430 can be used without any limitations. However, an IP address is preferably used. For example, in the connection-number management table shown in FIG. 7, the base-data relay apparatus with the IP address "1.4.2.2" is connected to four terminals.

Each Functional Unit of the Selecting Apparatus

Each unit of the selecting apparatus 410 will be described in detail below. The transmitting-receiving unit 411 of the selecting apparatus 410 is implemented by the network I/F 209 shown in FIG. 3, and performs transmission and reception of various data (information) with other terminals, apparatuses, or systems via the communication network 2, the LAN 2e, or the like. The selecting unit 412 selects a base-data relay apparatus used for relaying base data from among base-data relay apparatuses having the smallest connection number among the base-data relay apparatuses (430a and 430b) managed by the connection-number management table (see FIG. 7) every time communication is performed between terminals. In the embodiment, the base-data relay apparatus 430 having the smallest connection number is selected. However, the present invention is not limited to this method. It is possible to employ other methods for selecting a base-data relay apparatus for each communication between terminals. A connection-number managing unit 413 stores and manages the connection number as the number of the terminals 10 that transmit base data to the base-data relay apparatus 430 in the connection-number management table (see FIG. 7) for each base-data relay apparatus identification information that is used for identifying the base-data relay apparatus. The method for acquiring the connection number is not specifically limited. Examples of the method include a method for updating the connection number every time the selecting unit 412 selects a base-data relay apparatus or every time communication ends, and a method for measuring the number of pieces of base data transmitted and received via the selecting apparatus 410. The storage-read processing unit 19 is implemented by the HDD 205 shown in FIG. 3, and performs processing of storing various data in the storage unit 4100 and reading various data stored in the storage unit 4100.

Entire Configuration of the Base-Data Relay Apparatus

The base-data relay apparatus 430 includes a transmitting-receiving unit 431 and a base-data relaying unit 436. Each unit is a function or a means implemented by driving any of the components shown in FIG. 3 in response to a command that the CPU 201 has issued according to the program stored in the ROM 202.

Functional Configuration of the Base-Data Relay Apparatus

Each unit of the base-data relay apparatus 430 will be described below. The transmitting-receiving unit 431 of the base-data relay apparatus 430 is implemented by the network I/F 209 shown in FIG. 2, and performs transmission and reception of various data (information) with other terminals, apparatuses, or systems via the LAN 2e. The base-data relaying unit 436 relays base data transmitted from a terminal as a transmission source to a terminal as a destination.

Functional Configuration of the Extended-Data Relay Apparatus

Functions or means of the extended-data relay apparatus 30 will be described below. The extended-data relay apparatus 30 includes a transmitting-receiving unit 31, a state detecting unit 32, a data-quality confirming unit 33, a changed-quality managing unit 34, a data-quality changing unit 35, an extended-data relaying unit 36, and a storage-read processing unit 39. Each unit is a function or a means implemented by driving any of the components shown in FIG. 3 in response to a command that the CPU 201 has issued according to the program stored in the ROM 202. The extended-data relay apparatus 30 further includes a storage unit 3000 formed of the HD 204 shown in FIG. 3.

Changed-Quality Management Table

A changed-quality management DB (Database) 3001 formed of a changed-quality management table as shown in FIG. 8 is constructed in the storage unit 3000. In the changed-quality management table, an IP address of the terminal 10 that is a relay destination of image data, and quality of the image data (extended data to be relayed) that the extended-data relay apparatus 30 relays to the relay destination are managed in an associated manner.

Figure 6A:
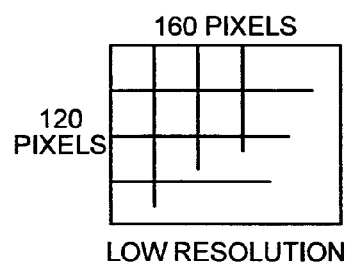
FIGS. 6A to 6C are schematic diagrams for explaining image quality of image data.
Figure 6B:
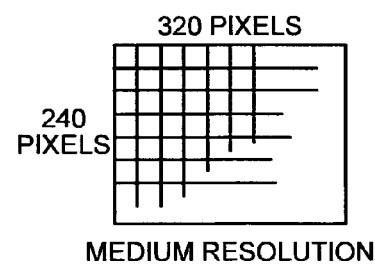
Figure 6C:
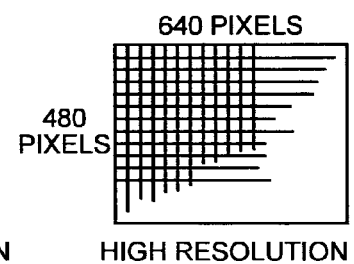

The resolution of an image of image data to be handled in the embodiment will be described. It is assumed that there is an image, as a base image, with low resolution formed of 160 horizontal pixels and 120 vertical pixels as shown in FIG. 6A; there is an image with medium resolution formed of 320 horizontal pixels and 240 vertical pixels as shown in FIG. 6B; and there is an image with high resolution formed of 640 horizontal pixels and 480 vertical pixels as shown in FIG. 6C. When a narrowband channel is used, image data of low image quality, which is formed of only the image data with low resolution as the base image, is relayed. When the band is relatively wide, the image data with low resolution as the base image and image data of medium image quality, which is formed of the image data of medium resolution, are relayed. When the band is extremely wide, the image data with low resolution as the base image, the image data with medium resolution, and image data of high quality, which is formed of the image data with high resolution, are relayed. For example, in the changed-quality management table shown in FIG. 8, when the extended-data relay apparatus 30 relays image data to a destination terminal with an IP address "1.3.2.4" (the terminal 10db), image quality (quality of the image) of the image data to be relayed is "high quality".

Each Functional Unit of the Extended-Data Relay Apparatus

Each functional configuration of the extended-data relay apparatus 30 will be described in detail below. In the following, a relation with main components for implementing each unit of the extended-data relay apparatus 30 from among the components shown in FIG. 2 is also described along with explanation of each unit of the extended-data relay apparatus 30.

The transmitting-receiving unit 31 of the extended-data relay apparatus 30 shown in FIG. 4 is implemented by the network I/F 209 shown in FIG. 3, and performs transmission and reception of various data (information) with other terminals, apparatuses, or systems via the communication network 2. The state detecting unit 32 is implemented by a command from the CPU 201 shown in FIG. 3, and detects an operating state of the extended-data relay apparatus 30 having the state detecting unit 32. The operating state includes "online", "offline", and "failure".

The data-quality confirming unit 33 is implemented by a command from the CPU 201 shown in FIG. 3. The data-quality confirming unit 33 searches through the changed-quality management DB 3001 (see FIG. 4) by using an IP address of a destination terminal as a search key, and extracts corresponding image quality of image data to be relayed, thereby confirming the image quality of the image data to be relayed. The changed-quality managing unit 34 is implemented by a command from the CPU 201 shown in FIG. 3, and changes the contents of the changed-quality management DB 3001 based on quality information, which will be described below, transmitted from the management system 50. For example, when a teleconference is being performed by transmitting and receiving image data of high image quality between a request source terminal (the terminal 10aa) with the terminal ID "01aa" and a destination terminal (the terminal 10db) with the terminal ID "01db", and if delay occurs in receiving image data by the destination terminal (the terminal 10db) because of start of another teleconference between a request source terminal (the terminal 10bb) and a destination terminal (the terminal 10ca), the extended-data relay apparatus 30 needs to decrease the image quality of the image data being relayed from high image quality to medium image quality. In this case, the contents of the changed-quality management DB 3001 is changed so that the image quality of the image data to be relayed by the extended-data relay apparatus 30 is decreased from high image quality to medium image quality based on the quality information indicating the medium image quality.

The data-quality changing unit 35 is implemented by a command from the CPU 201 shown in FIG. 3, and changes the image quality of image data sent by the terminal 10 as a transmission source, based on the changed contents of the changed-quality management DB 3001. The extended-data relaying unit 36 relays extended data transmitted from a terminal as a transmission source to a terminal as a destination. The storage-read processing unit 39 is implemented by the HDD 205 shown in FIG. 3, and performs processing of storing various data in the storage unit 3000 and reading various data stored in the storage unit 3000.

Functional Configuration of the Management System

Functions and means of the management system 50 will be described below. The management system 50 includes a transmitting-receiving unit 51, a terminal authenticating unit 52, a state managing unit 53, a terminal extracting unit 54, a terminal-state acquiring unit 55, a primary narrowing-down unit 56, a session managing unit 57, a quality determining unit 58, a storage-read processing unit 59, an extended-data-delay-time managing unit 60, an extended-data relay requesting unit 61, and a base-data relay requesting unit 62. Each unit is a function or a means implemented by driving any of the components shown in FIG. 3 in response to a command that the CPU 201 has issued according to the program stored in the ROM 202. The management system 50 further includes a storage unit 5000 formed of the HD 204 shown in FIG. 3.

Extended-Data Relay Apparatus Management Table

An extended-data relay apparatus management DB 5001 formed of an extended-data relay apparatus management table as shown in FIG. 9 is constructed in the storage unit 5000. In the extended-data relay apparatus management table, an operating state of each extended-data relay apparatus 30, reception date and time at which the management system 50 has received state information indicating the operating state, an IP address of each extended-data relay apparatus 30, and a maximum data transmission rate (Mbps) of each extended-data relay apparatus 30 are managed in an associated manner for each of the extended-data relay apparatus IDs of the extended-data relay apparatuses 30. For example, in the extended-data relay apparatus management table shown in FIG. 9, it is indicated that, for the extended-data relay apparatus 30a with the extended-data relay apparatus ID "111a", the operating state is "online", state information is received by the management system 50 on "Nov. 10, 2009 at 13:00", an IP address is "1.2.1.2", and a maximum data transmission rate is 100 Mbps.

Terminal-Authentication Management Table

In the storage unit 5000, a terminal-authentication management DB 5002 formed of a terminal-authentication management table as shown in FIG. 10 is also constructed. In the terminal-authentication management table, a password is managed in association with the terminal ID of each of the terminals 10 managed by the management system 50. For example, in the terminal-authentication management table shown in FIG. 10, it is indicated that the terminal ID of the terminal 10aa is "01aa" and a password is "aaaa".

Terminal Management Table

In the storage unit 5000, a terminal management DB 5003 formed of a terminal management table as shown in FIG. 11 is also constructed. In the terminal management table, an operating state of each terminal 10, reception date and time at which the management system 50 has received login request information, which will be described below, and an IP address of each terminal 10 are managed in an associated manner for each of the terminal IDs of the terminals 10. For example, in the terminal management table shown in FIG. 11, it is indicated that, for the terminal 10aa with the terminal ID "01aa", the operating state is "online", login request information is received by the management system 50 on "Nov. 10, 2009 at 13:40", and an address is "1.2.1.3".

Destination-List Management Table

In the storage unit 5000, a destination-list management DB 5004 formed of a destination-list management table as shown in FIG. 12 is also constructed. In the destination-list management table, terminal IDs of all of terminals registered as potential destination terminals (or, candidate destination terminals, one of which may actually be used as a destination terminal) are managed in association with a terminal ID of each request source terminal that requests start of a teleconference. For example, in the destination-list management table shown in FIG. 12, it is indicated that a request source terminal with the terminal ID "01aa" (the terminal 10aa) can request three potential destination terminals to start a teleconference, which are the terminal 10ab with the terminal ID "01ab", the terminal 10ba with the terminal ID "01ba", and the terminal 10db with the terminal ID "01db". The potential destination terminals are updated by addition or deletion according to a request for addition or deletion sent by the request source terminal to the management system 50.

Session Management Table

In the storage unit 5000, a session management DB 5005 formed of a session management table as shown in FIG. 13 is also constructed. In the session management table, an extended-data relay apparatus ID of the extended-data relay apparatus 30 to be used for relaying image data and audio data, a terminal ID of a request source terminal, a terminal ID of a destination terminal, extended-data reception delay time (ms) taken to receive image data by the destination terminal, and reception date and time at which the management system 50 has received extended-data delay information, which indicates the extended-data delay time and which is transmitted from the destination terminal, are managed in an associated manner for each selection session ID that is used for performing a session for selecting the extended-data relay apparatus 30. For example, in the session management table shown in FIG. 13, it is indicated that the extended-data relay apparatus 30a (with the extended-data relay apparatus ID "111a") selected by the session performed by using the selection session ID "se1" relays image data and audio data between a request source terminal (the terminal 10aa) with the terminal ID "01aa" and a destination terminal (the terminal 10db) with the terminal ID "01db", and the extended-data delay time taken to receive the image data at the time of "Nov. 10, 2009 at 14:00" is 200 (ms). When a teleconference is performed between two terminals 10, it is possible to manage reception date and time of the extended-data delay information based on the extended-data delay information transmitted from the request source terminal rather than the information transmitted from the destination terminal. However, when a teleconference is performed among three or more terminals 10, the reception date and time of the extended-data delay information is managed based on the extended-data delay information transmitted from the terminal 10 on the receiving side of image data and audio data.

Address-Priority Management Table

In the storage unit 5000, a priority management DB 5006 formed of an address-priority management table as shown in FIG. 14 is also constructed. In the address-priority management table, point of the address priority is managed in an associated manner such that the point increases depending on whether four dot address portions of an IP address in general IPv4 are the same between an arbitrary terminal 10 and an arbitrary relay apparatus 30. For example, in the address-priority management table shown in FIG. 14, when values of three parts from top to bottom of the dot address are the same between IP addresses, the point of the address priority is "5". When values of two parts from top to bottom of the dot address are the same between the IP addresses, the point of the address priority is "3". In this case, whether a value at the bottommost part of the dot address is the same or not between the IP addresses does not affect the priority. When a value of the topmost part of the dot address is the same and a value of the second top part is different between the IP addresses, the point of the address priority is "1". In this case, whether a value of the third part from the top and a value of the bottommost part are the same or not between the IP addresses does not affect the priority. When a value of the topmost part of the dot address is different between the IP addresses, the point of the address priority is "0". In this case, whether values of the second, the third, and the bottommost parts from the top of the dot address are the same or not between the IP addresses does not affect the priority.

Transmission-Rate Priority Management Table

The priority management DB 5006, constructed in the storage unit 5000, also contains a transmission-rate priority management table as shown in FIG. 15. In the transmission-rate priority management table, point of the transmission-rate priority is managed in an associated manner such that the point increases depending on the value of the maximum data transmission rate (Mbps) of the extended-data relay apparatus 30. For example, in the transmission-speed priority management table shown in FIG. 15, when the maximum data transmission rate of the extended-data relay apparatus 30 is equal to or greater than 1000 Mbps, the point of the transmission-rate priority is "5". When the maximum data transmission rate of the extended-data relay apparatus 30 is equal to or grater than 100 Mbps and smaller than 1000 Mbps, the point of the transmission-rate priority is "3". When the maximum data transmission rate of the extended-data relay apparatus 30 is equal to or grater than 10 Mbps and smaller than 100 Mbps, the point of the transmission-rate priority is "1". When the maximum data transmission rate of the extended-data relay apparatus 30 is smaller than 10 Mbps, the point of the transmission-rate priority is "0".

Quality Management Table

In the storage unit 5000, a quality management DB 5007, formed of a quality management table as shown in FIG. 16, is also constructed. In the quality management table, image quality of image data (extended data to be relayed) to be relayed by the extended-data relay apparatus 30 is managed in association with the extended-data delay time (ms) taken to receive image data by a request source terminal or a destination terminal.

Base-Data Relay System Management Table

In the storage unit 5000, a base-data relay system management DB 5008 formed of a base-data relay system management table as shown in FIG. 17 is also constructed. In the base-data relay system management table, a base-data relay system ID of the base-data relay system 40 and an IP address of the selecting apparatus 410 of the base-data relay system 40 are managed in an associated manner. For example, in the base-data relay system management table shown in FIG. 17, it is indicated that a selecting apparatus for the base-data relay system with a base-data relay system ID "222a" has an IP address "1.4.1.1".

Each Functional Unit of the Management System

Each functional unit of the management system 50 will be described in detail below. In the following, a relation with main components for implementing each unit of the management system 50 from among the components shown in FIG. 3 is also described along with explanation of each unit of the management system 50.

The transmitting-receiving unit 51 is implemented by the network I/F 209 shown in FIG. 2, and performs transmission and reception of various data (or information) with other terminals, apparatuses, or systems via the communication network 2.

The terminal authenticating unit 52 searches through the terminal-authentication management DB 5002 of the storage unit 5000 by using a terminal ID and a password contained in the login request information as a search key received via the transmitting-receiving unit 51; and performs authentication of the terminal by determining whether the same terminal ID and password are managed by the terminal-authentication management DB 5002. The state managing unit 53 stores and manages, in the terminal management table (see FIG. 11) of the terminal management DB 5003, the terminal ID of the request source terminal, the operating state of the request source terminal, the reception date and time at which the management system 50 has received the login request information, and the IP address of the request source terminal 10 in an associated manner in order to manage the operating state of the request source terminal that has sent the login request.

The terminal extracting unit 54 searches through the destination-list management table (see FIG. 12) of the destination-list management DB 5004 by using, as a search key, the terminal ID of the request source terminal that has sent the login request, and reads terminal IDs of potential destination terminals that can communicate with the request source terminal, thereby extracting the terminal IDs. The terminal extracting unit 54 also searches through the destination-list management table by using, as a search key, the terminal ID of the request source terminal that has sent the login request, and extracts terminal IDs of other request source terminals for which the terminal ID of the request source terminal is registered as a potential destination terminal.

The terminal-state acquiring unit 55 searches through the terminal management table (see FIG. 11) of the terminal management DB 5003 by using, as a search key, the terminal IDs of the potential destination terminals extracted by the terminal extracting unit 54, and reads the operating state for each terminal ID that has been extracted by the terminal extracting unit 54. Accordingly, the terminal-state acquiring unit 55 can acquire the operating states of the potential destination terminals that can communicate with the request source terminal that has sent the login request. The terminal-state acquiring unit 55 also searches through the terminal management table by using, as a search key, the terminal IDs extracted by the terminal extracting unit 54, and acquires the operating state of the request source terminal that has sent the login request.

The primary narrowing-down unit 56 includes a selection-session-ID generating unit 56a, a terminal-IP-address extracting unit 56b, a primary selecting unit 56c, and a priority determining unit 56d in order to perform a primary narrowing-down process before an ultimate narrowing-down process for supporting the ultimate narrowing-down process in which a plurality of the extended-data relay apparatuses 30 is narrowed down to one extended-data relay apparatuses 30. The selection-session-ID generating unit 56a generates a selection session ID used for performing a session for selecting the extended-data relay apparatus 30. The terminal-IP-address extracting unit 56b searches through the terminal management table (see FIG. 11) of the terminal management DB 5003 based on the terminal ID of the request source terminal and the terminal ID of the destination terminal, which are contained in start request information sent from the request source terminal, thereby extracting an IP address of each corresponding terminal 10. The primary selecting unit 56c selects extended-data relay apparatus IDs of the extended-data relay apparatuses 30 of which operating states are "online" from among the extended-data relay apparatuses 30 managed by the extended-data relay apparatus management DB 5001 (see FIG. 9), thereby selecting the extended-data relay apparatuses 30.

The primary selecting unit 56c searches through the extended-data relay apparatus management table (see FIG. 9) of the extended-data relay apparatus management DB 5001 based on the IP address of the request source terminal and the IP address of the destination terminal, which are extracted by the terminal-IP-address extracting unit 56b, and examines whether each dot address of the IP address of each of the request source terminal and the destination terminal is the same or different with respect to each dot address of the IP address of the selected extended-data relay apparatus 30. The primary selecting unit 56c selects top two extended-data relay apparatuses 30 in an order from the highest combination point, which is a point in which a higher address priority point between the address priority points with respect to the terminal 10 and the point of the transmission-rate priority are combined together. Accordingly, the extended-data relay apparatuses 30 are further selected.

In the embodiment, the top two extended-data relay apparatuses 30 are selected in order from the highest point. However, the present invention is not limited to this example. As long as it is possible to narrow the extended-data relay apparatuses 30 down as small as possible, it is possible to select top three or more extended-data relay apparatuses 30 in an order from the highest point.

The priority determining unit 56d refers to the address-priority management table (see FIG. 14) of the priority management DB 5006, and determines point of the address priority for each extended-data relay apparatus 30 examined by the primary selecting unit 56c. The priority determining unit 56d searches through the transmission-rate priority management table (see FIG. 15) of the priority management DB 5006 based on the maximum data transmission rate of each extended-data relay apparatus 30 managed by the extended-data relay apparatus management DB 5001 (see FIG. 4) and determines point of the transmission-rate priority for each extended-data relay apparatus 30 narrowed down by the primary narrowing-down process performed by the primary selecting unit 56c.

The session managing unit 57 stores and manages, in the session management DB 5005 of the storage unit 5000 (see FIG. 4), the selection session ID generated by the selection-session-ID generating unit 56a, the terminal ID of the request source terminal, and the terminal ID of the destination terminal in an associated manner. The session managing unit 57 stores and manages, in the session management DB 5005 (see FIG. 4), the extended-data relay apparatus ID of one extended-data relay apparatus 30 that is ultimately selected by the ultimate selecting unit 16c of the terminal 10 for each selection session ID.

The quality determining unit 58 searches through the quality management table (see FIG. 16) of the quality management DB 5007 by using the extended-data delay time as a search key, and extracts corresponding image quality of the image data, thereby determining the image quality of the image data to be relayed to the extended-data relay apparatus 30. The storage-read processing unit 59 is implemented by the HDD 205 shown in FIG. 3, and performs processing of storing various data in the storage unit 5000 and reading various data stored in the storage unit 5000.

The extended-data-delay-time managing unit 60 searches through the terminal management table (see FIG. 11) of the terminal management DB 5003 by using the IP address of the destination terminal as a search key, extracts a corresponding terminal ID, and stores and manages the extended-data delay time, which is indicated by the extended-data delay information, in a field portion corresponding to the extended-data delay time in the record containing the extracted terminal ID in the session management table (see FIG. 13) of the session management DB 5005.

The extended-data relay requesting unit 61 requests the extended-data relay apparatus selected from the extended-data relay apparatuses (30a, 30b, 30c, and 30d) to start relaying extended data. In this case, the extended-data relay requesting unit 61 transmits extended-data relay request information, which indicates that the start of relay of the extended data is requested, to the selected extended-data relay apparatus via a transmitting-receiving unit 511.

The base-data relay requesting unit 62 requests a predetermined base-data relay system 40 to start relaying base data. More specifically, when receiving the start request information indicating start of communication from the terminal 10, the base-data relay requesting unit 62 acquires an IP address of the selecting apparatus of the base-data relay system from the base-data relay system management table (see FIG. 17) of the base-data relay system management DB. The base-data relay requesting unit 62 then transmits base-data relay request information, which indicates a request for start of relay of the base data, to the selecting apparatus 410 via the transmitting-receiving unit 511 based on the acquired IP address.

Process and Operation of the Embodiment

Figure 24:
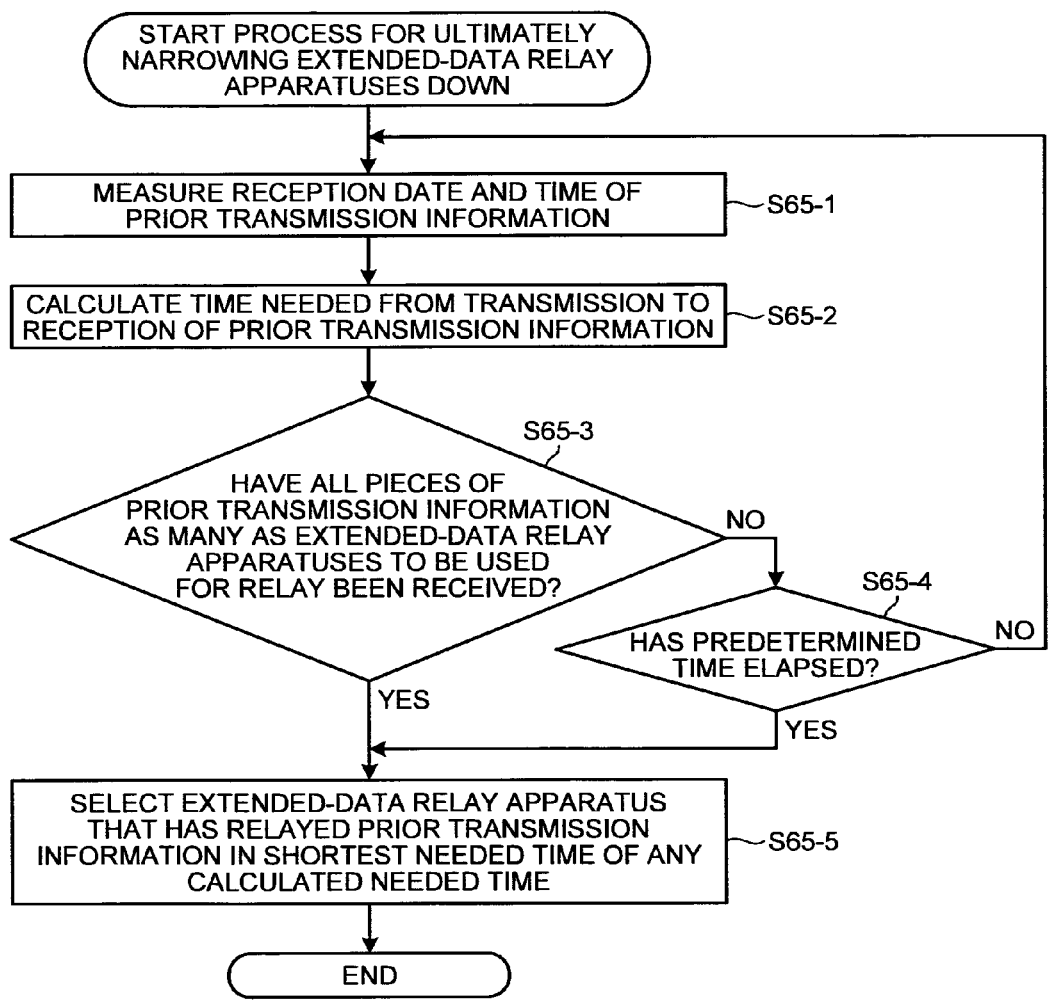
FIG. 24 is a flow diagram of a process for selecting a relay apparatus by the transmission terminal.
Figure 25:
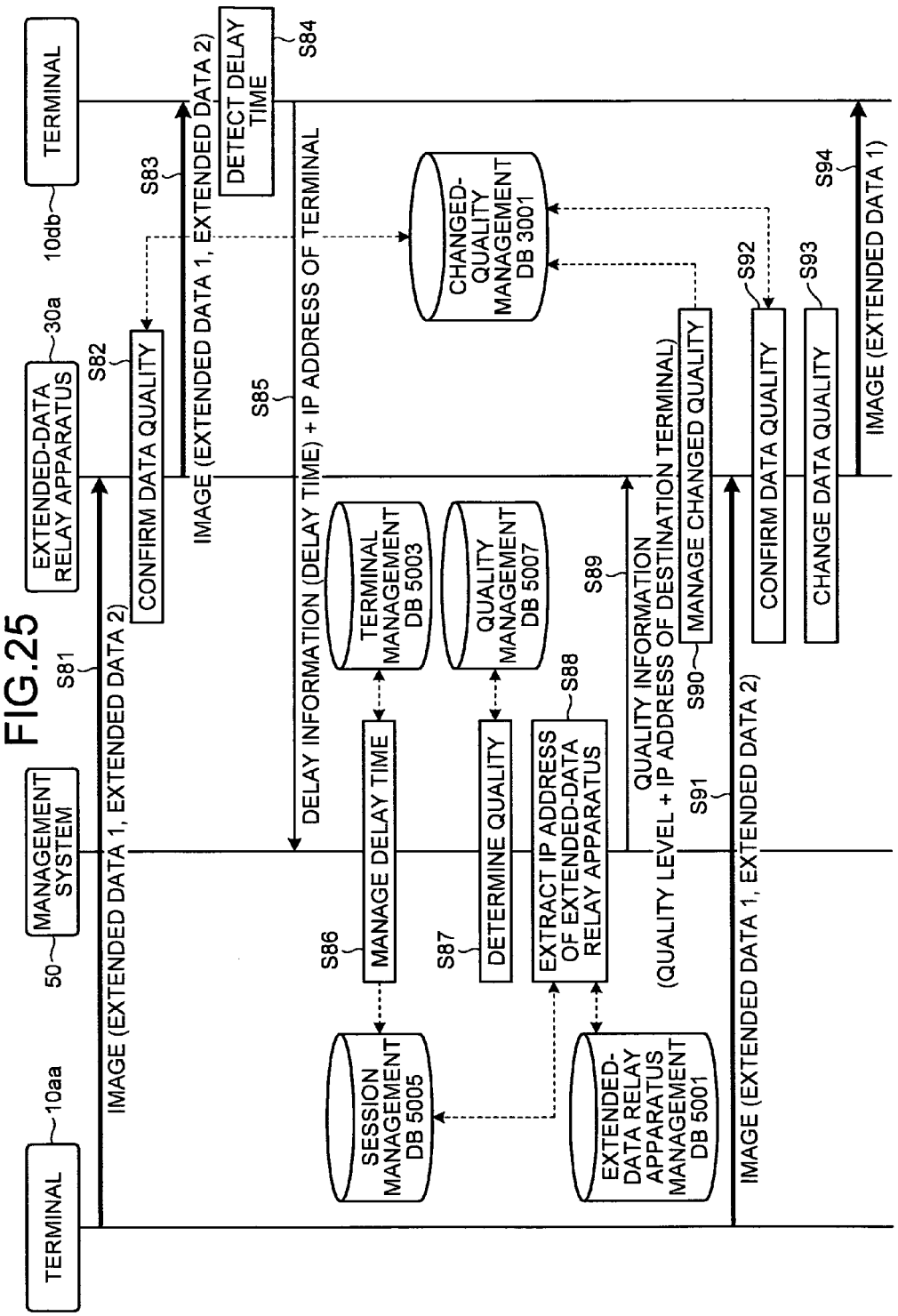
FIG. 25 is a sequence diagram of a process for transmitting and receiving image data and audio data between transmission terminals.
Figure 26:
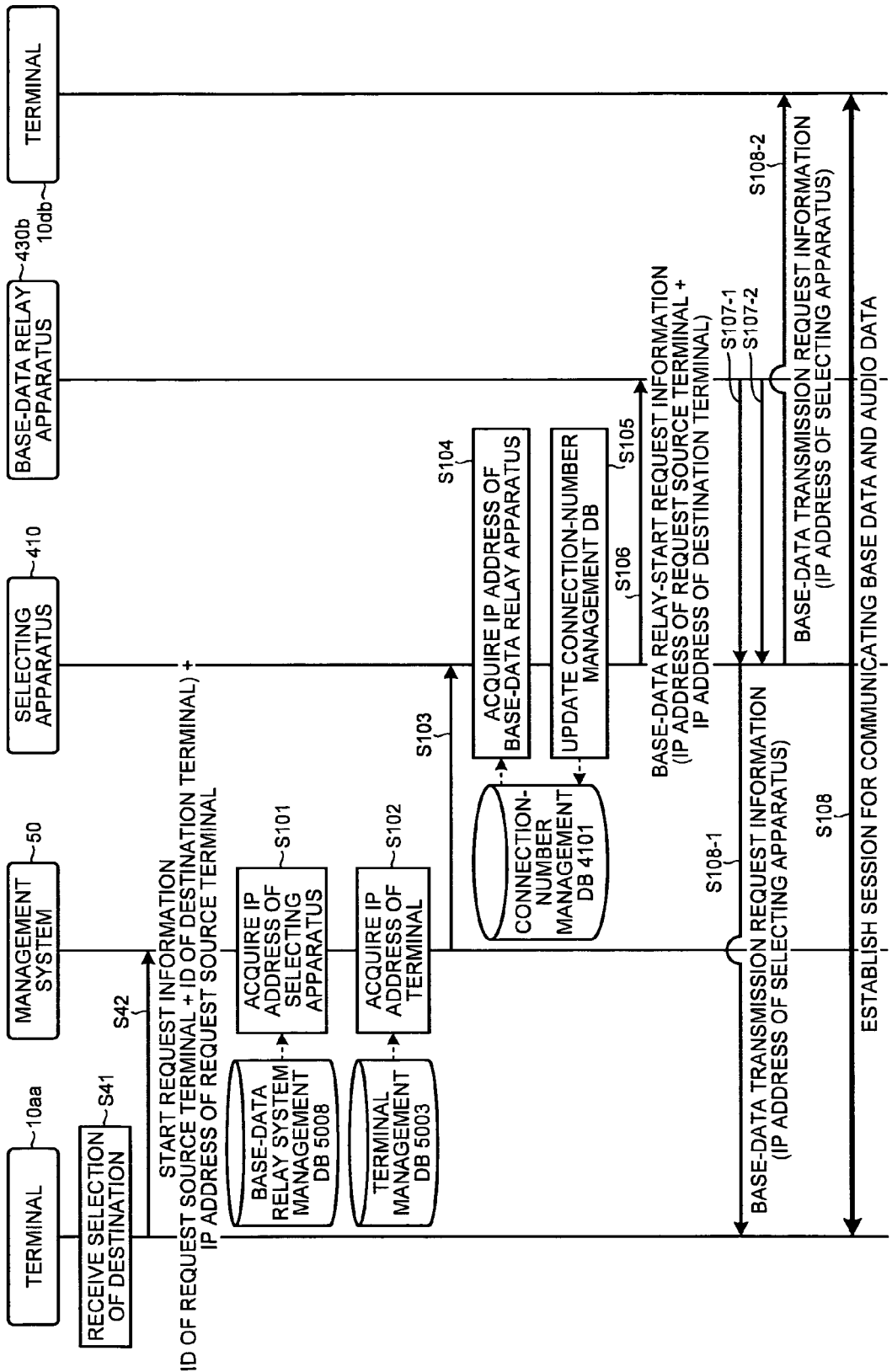
FIG. 26 is a sequence diagram of a process for transmitting and receiving base data between transmission terminals by relaying the base data by a base-data relay system.

The configuration and functions (or means) of the transmission system 1 according to the embodiment are described above. With reference to FIGS. 18 to 26, explanation will be given of a processing method performed by the transmission system 1 of the embodiment. FIG. 18 is a sequence diagram of a process for managing state information indicating the state of each extended-data relay apparatus 30, which is transmitted from each extended-data relay apparatus 30 to the management system 50. FIG. 19 is a sequence diagram of a preparatory process for starting communication between the transmission terminals 10. FIG. 20 is a sequence diagram of a process for narrowing the extended-data relay apparatuses 30 down. FIG. 21 is a flow diagram of a process for narrowing the extended-data relay apparatuses 30 down. FIG. 22 is a diagram illustrating calculation of points for performing the process for narrowing the extended-data relay apparatuses 30 down. FIG. 23 is a sequence diagram of a process for selecting the extended-data relay apparatus 30 by the terminal 10. FIG. 24 is a flow diagram of a process for selecting the extended-data relay apparatus 30 by the terminal. FIG. 25 is a sequence diagram of a process for transmitting and receiving image data and audio data between terminals. FIG. 26 is a sequence diagram of a process for transmitting and receiving base data between terminals by relaying the base data by a base-data relay system.

With reference to FIG. 18, explanation will be given of a process for managing the state information indicating the state of each extended-data relay apparatus 30, which is transmitted from each extended-data relay apparatus 30 to the management system 50. In each extended-data relay apparatus 30, the state detecting unit 32 shown in FIG. 4 periodically detects the operating state of own extended-data relay apparatus 30 (S1-1 to S1-4). The transmitting-receiving unit 31 of each extended-data relay apparatus 30 periodically transmits each state information to the management system 50 via the communication network 2 in order to allow the management system 50 to manage the operating state of each extended-data relay apparatus 30 in real time (Steps S2-1 to S2-4). Each state information contains the extended-data relay apparatus ID of each extended-data relay apparatus 30 and the operating state detected by the state detecting unit 32 of the extended-data relay apparatus 30 corresponding to each extended-data relay apparatus ID. According to the embodiment, an example is illustrated in which the extended-data relay apparatuses (30a, 30b, and 30d) are normally operating in the "online" state while the extended-data relay apparatus 30c is in the "offline" state because a failure occurs in a program that causes the extended-data relay apparatus 30c to perform a relay operation.

The transmitting-receiving unit 51 of the management system 50 receives the state information sent from each extended-data relay apparatus 30, and the state information is stored and managed by the extended-data relay apparatus management DB 5001 (see FIG. 9) of the storage unit 5000 via the storage-read processing unit 39 for each extended-data relay apparatus ID (Steps S3-1 to S3-4). Accordingly, one of the operating states "online", "offline", and "failure" is stored and managed by the extended-data relay apparatus management table as shown in FIG. 9 for each extended-data relay apparatus ID. At the same time, the reception date and time at which the management system 50 has received the state information is stored and managed for each extended-data relay apparatus ID. When the state information is not sent by the extended-data relay apparatus 30, a field portion for the operating state and a field portion for the reception date and time remain blank, or the field portions are filled with the operating state and the reception date and time at the time of previous reception.

With reference to FIG. 19, explanation will be given of a preparatory process for starting communication between the terminal 10aa and the terminal 10db. When a user turns on the power switch 109 shown in FIG. 2, the operation-input receiving unit 12 shown in FIG. 4 receives power-on and turns on the power source (Step S21). The login requesting unit 13 automatically transmits login request information indicating a login request from the transmitting-receiving unit 11 to the management system 50 via the communication network 2 upon reception of the power-on (Step S22). The login request information contains a terminal ID and a password for identifying own terminal 10aa that is a request source. The terminal ID and the password are data that are read from the storage unit 1000 via the storage-read processing unit 19 and transmitted by the transmitting-receiving unit 11. When the login request information is transmitted from the terminal 10aa to the management system 50, the management system 50 that is the receiving side can recognize the IP address of the terminal 10aa that is the transmitting side.

The terminal authenticating unit 52 of the management system 50 searches through the terminal authentication management table (see FIG. 10) of the terminal-authentication management DB 5002 of the storage unit 5000 by using, as a search key, the terminal ID and the password contained in the login request information received via the transmitting-receiving unit 51, and performs terminal authentication by determining whether the same terminal ID and password are managed by the terminal-authentication management DB 5002 (Step S23). When the terminal authenticating unit 52 determines that the same terminal ID and password are managed and thereby determines that the login request is sent from the terminal 10 that has valid access authority, the state managing unit 53 stores the terminal ID of the terminal 10aa, the operating state, the reception date and time at which the login request information is received, and the IP address of the terminal 10aa in the terminal management DB 5003 (see FIG. 11) in an associated manner (Step S24). Accordingly, the terminal ID "01aa", the operating state "online", the reception date "2009. 11. 10. 13:40", and the terminal IP address "1.2.1.3" are managed by the terminal management table shown in FIG. 11 in an associated manner.

The transmitting-receiving unit 51 of the management system 50 transmits authentication result information, which indicates an authentication result obtained by the terminal authenticating unit 52, to the request source terminal (the terminal 10aa) that has sent the login request, via the communication network 2 (Step S25). In the embodiment, an example is explained in which the terminal authenticating unit 52 determines that the terminal has valid access authority.

The terminal extracting unit 54 of the management system 50 searches through the destination-list management table (see FIG. 12) of the destination-list management DB 5004 by using, as a search key, the terminal ID "01aa" of the request source terminal (the terminal 10aa) that has sent the login request, and reads and extracts the terminal IDs of potential destination terminals that can communicate with the request source terminal (the terminal 10aa) (Step S26). In this example, the terminal IDs "01ab", "01ba", and "01db" of the respective destination terminals (10ab, 10ba, and 10db) associated with the terminal ID "01aa" of the request source terminal (the terminal 10aa) are extracted.

The terminal-state acquiring unit 55 searches through the terminal management DB 5003 (see FIG. 11) by using, as a search key, the terminal IDs ("01ab", "01ba", and "01db") of the potential destination terminals extracted by the terminal extracting unit 54, and reads the operating states ("offline", "online", and "online") of the respective terminal IDs extracted by the terminal extracting unit 54, thereby acquiring the operating states of the terminals (10ab, 10ba, and 10db) (Step S27).

The transmitting-receiving unit 51 transmits destination state information containing the terminal IDs ("01ab", "01ba", and "01db"), which are used as the search key at Step S27, and the operating state ("offline", "online", and "online") of the respective destination terminals (10ab, 10ba, and 10db) to the request source terminal (the terminal 10aa) via the communication network 2 (Step S28). Therefore, the request source terminal (the terminal 10aa) can recognize the current operating states ("offline", "online", and "online") of the respective terminals (10ab, 10ba, and 10db) as the potential destination terminals that can communicate with the request source terminal (the terminal 10aa).

The terminal extracting unit 54 of the management system 50 searches through the destination-list management DB 5004 (see FIG. 12) by using, as a search key, the terminal ID "01aa" of the request source terminal (the terminal 10*aa*) that has sent the login request, and extracts terminal IDs of other request source terminals for which the terminal ID "01aa" of the request source terminal (the terminal 10*aa*) is registered as a potential destination terminal (Step S29). In the destination-list management table shown in FIG. 12, the terminal IDs of the other request source terminals to be extracted are "01ab", "01ba", and "01db".

The terminal-state acquiring unit 55 of the management system 50 searches through the terminal management DB 5003 (see FIG. 11) by using, as a search key, the terminal ID "01aa" of the request source terminal (the terminal 10*aa*) that has sent the login request, and acquires the operating state of the request source terminal (the terminal 10*aa*) that has sent the login request (Step S30).

The transmitting-receiving unit 51 transmits, to the terminals of which operating states are "online" (10*ba* and 10*db*) in the terminal management table (see FIG. 11) from among the terminals (10*ab*, 10*ba*, and 10*db*) corresponding to the terminal IDs ("01ab", "01ba", and "01db") extracted at Step S29, the destination state information containing the terminal ID "01aa" of the request source terminal (the terminal 10*aa*) and the operating state of "online" acquired at Step S30 (Steps S31-1 and S31-2). When the transmitting-receiving unit 51 transmits the destination state information to the terminals (10*ba* and 10*db*), the transmitting-receiving unit 51 refers to the IP addresses of the terminals managed by the terminal management table shown in FIG. 11 based on the terminal IDs ("01ba" and "01db"). Accordingly, it is possible to notify each of the destination terminals (the terminals 10*db* and 10*ba*), which can communicate with the request source terminal (the terminal 10*aa*) that serves as a destination and that has sent the login request, of the terminal ID "01aa" of the request source terminal (the terminal 10*aa*) that has sent the login request and the operating state of "online".

In the other terminals 10, similarly to Step S21 described above, when a user turns on the power switch 109 shown in FIG. 3, the operation-input receiving unit 12 shown in FIG. 4 receives the power-on and the same processes as those of Steps S22 to S31-1, S31-2 are performed. The same explanation is not repeated.

With reference to FIG. 26, explanation will be given of a process for performing communication between terminals by relaying base data and audio data by the base-data relay apparatus 430. In the embodiment, the request source terminal (the terminal 10*aa*) can perform communication with at least one of the terminals (10*ba* and 10*db*) of which operating states are online according to the destination state information received at Step S28 from among the terminals 10 that serve as potential destinations. In the following, an example will be described in which a user of the request source terminal (the terminal 10*aa*) selects start of communication with the destination terminal (the terminal 10*db*).

When the user presses the operation button 108 shown in FIG. 2 to select the terminal 10*db*, the operation-input receiving unit 12 shown in FIG. 4 receives a request for start of communication with the destination terminal (the terminal 10*db*) (Step S41). The transmitting-receiving unit 11 of the terminal 10*aa* transmits, to the management system 50, the start request information, which contains the terminal ID "01aa" of the request source terminal (the terminal 10*aa*) and the terminal ID "01db" of the destination terminal (the terminal 10*db*) and which indicates start of the communication (Step S42). Accordingly, the transmitting-receiving unit 51 of the management system 50 receives the start request information and recognizes the IP address "1.2.1.3" of the request source terminal (the terminal 10*aa*) as the transmission source.

The base-data relay requesting unit 62 acquires the IP address of a selecting apparatus of the base-data relay system from the base-data relay system management table (see FIG. 17) of the base-data relay system management DB (Step S101). In this example, the IP address "1.4.1.1." of the selecting apparatus is acquired. The base-data relay requesting unit 62 acquires the IP address of the request source terminal and the IP address of the destination terminal from the terminal management table (see FIG. 11) of the terminal management DB by using, as a search key, the request source terminal ID and the destination terminal ID, which are contained in the start request information (Step S102). In this example, the IP address "1.2.1.3" of the request source terminal and the IP address "1.3.2.4" of the destination terminal are acquired.

The base-data relay requesting unit 62 transmits base-data relay-start request information, which contains the IP address "1.2.1.3" of the request source terminal (the terminal 10*aa*) and the IP address "1.3.2.4" of the destination terminal (the terminal 10*db*) and which indicates a request for start of relay of base data, to the selecting apparatus via the transmitting-receiving unit 51 (Step S103).

When the transmitting-receiving unit 411 of the selecting apparatus 410 receives the base-data relay-start request information, the selecting unit 412 acquires the IP address of a base-data relay apparatus of which connection number is the smallest from among the base-data relay apparatuses (430*a* and 430*b*) managed by the connection-number management table (see FIG. 7) of the connection-number management DB 4101 (Step S104). In this example, the IP address "1.4.2.3" of the base-data relay apparatus is acquired. The connection-number managing unit 413 updates the connection number associated with the IP address "1.4.2.3" from "2" to "4" in the connection-number management table via the storage-read processing unit 419 (S105).

The transmitting-receiving unit 411 of the selecting apparatus 410 transmits the base-data relay-start request information, which contains the IP address "1.2.1.3" of the request source terminal (the terminal 10*aa*) and the IP address "1.3.2.4" of the destination terminal (the terminal 10*db*) and which indicates a request for start of relay of base data and audio data, to the base-data relay apparatus 430*b* based on the acquired IP address (Step S106). Accordingly, the base-data relaying unit 436 of the base-data relay apparatus 430*b* specifies the request source terminal (the terminal 10*aa*) or the destination terminal (the terminal 10*db*) as a destination, and transmits to the selecting apparatus 410 base-data transmission request information which contains the IP address of the selecting apparatus 410 and which indicates a request for transmission of base data and audio data (Steps S107-1 and S107-2). The selecting apparatus 410 transmits the received base-data transmission request information to the request source terminal (the terminal 10*aa*) or the destination terminal (the terminal 10*db*) as the destination (Steps S108-1 and S108-2). The request source terminal (the terminal 10*aa*) and the destination terminal (the terminal 10*db*) respectively transmit, to the base-data relay apparatus 430*b* via the selecting apparatus 410, base data and audio data as a response to the request. The relaying unit 436 of the base-data relay apparatus 430*b* relays the base data or the like received from one terminal to the other terminal, so that a session for communicating the base data is established (Step S108).

With reference to FIG. 20, explanation will be given of a process for communicating extended data between the request source terminal (the terminal 10aa) and the destination terminal (the terminal 10db). When the transmitting-receiving unit 51 of the management system 50 receives the start request information indicating a request for start of communication from the terminal 10aa (Step S42 in FIGS. 20 and 26), the state managing unit 53 changes contents of field portions corresponding to the operating state in the records containing the terminal ID "01aa" and the terminal ID "01db" in the terminal management table (see FIG. 11) of the terminal management DB 5003 to "busy" based on the terminal ID "01aa" of the request source terminal (the terminal 10aa) and the terminal ID "01db" of the destination terminal (the terminal 10db), which are contained in the start request information (Step S43). In this state, communication (call) is not started between the request source terminal (the terminal 10aa) and the destination terminal (the terminal 10db); however, the busy state is indicated. Therefore, when other terminals 10 attempt to communicate with the request source terminal (the terminal 10aa) or the destination terminal (the terminal 10db), audio or display indicating the busy state is output.

A process for performing a session for selecting the extended-data relay apparatus 30 at Steps S44 to S48 and Steps S61-1 to S66 will be described below. The selection-session-ID generating unit 56a generates a selection session ID used for performing a session for selecting the extended-data relay apparatus 30 (Step S44). The session managing unit 57 stores and manages the selection session ID "se1" generated at Step S44, the terminal ID "01aa" of the request source terminal (the terminal 10aa), and the terminal ID "01db" of the destination terminal (the terminal 10db) in the session management DB 5005 (see FIG. 4) of the storage unit 5000 in an associated manner (Step S45).

The primary narrowing-down unit 56 of the management system 50 primary narrows the extended-data relay apparatuses 30 down for relaying communication between the request source terminal (the terminal 10aa) and the destination terminal (the terminal 10db) based on the extended-data relay apparatus management DB 5001, the terminal management DB 5003, and the priority management DB 5006 (Step S46).

The process at Step S46 will be described in detail below with reference to FIG. 21. The terminal-IP-address extracting unit 56b searches through the terminal management DB 5003 (see FIG. 11) based on the terminal ID "01aa" of the request source terminal (the terminal 10aa) and the terminal ID "01db" of the destination terminal (the terminal 10db), and extracts the IP addresses ("1.2.1.3" and "1.3.2.4") of corresponding terminals (10aa and 10db) (Step S46-1). The primary selecting unit 56c selects extended-data relay apparatus IDs (111a, 111b, and 111d) of the extended-data relay apparatuses (30a, 30b, and 30d) in the "online" state among the operating states of the extended-data relay apparatuses 30 managed by the extended-data relay apparatus management DB 5001 (see FIG. 9) (Step S46-2). The primary selecting unit 56c searches through the extended-data relay apparatus management DB 5001 (see FIG. 9) based on the IP address "1.2.1.3" of the request source terminal (the terminal 10aa) and the IP address "1.3.2.4" of the destination terminal (the terminal 10db), which are extracted at Step S46-1, and examines whether each dot address of the IP addresses ("1.2.1.3" and "1.3.2.4") of the request source terminal (the terminal 10aa) and the destination terminal (the terminal 10db) is the same or different with respect to each dot address of the IP addresses ("1.2.1.2", "1.2.2.2", and "1.3.2.2") of the extended-data relay apparatuses (30a, 30b, and 30d) selected at Step S46-2 (Step S46-3).

A priority determining unit 57c determines point of the address priority for each extended-data relay apparatus (30a, 30b, and 30d) examined at Step S46-3, by referring to the priority management DB 5006 (see FIG. 14) (Step S46-4). A result of the determination process is indicated in a table as shown in FIG. 22. FIG. 22 is a diagram illustrating calculation of points of the priority for performing a process for narrowing the extended-data relay apparatuses 30 down. In FIG. 22, point of the address priority, point of the transmission-rate priority, and combination point are provided for each extended-data relay apparatus ID. As the point of the address priority, point for the request source terminal (the terminal 10aa) and point for the destination terminal (the terminal 10db) are provided for each extended-data relay apparatus 30. The combination point is a total point of a higher point between the two points of the address priority and the point of the transmission-rate priority.

In the embodiment, the IP address "1.2.1.2" of the extended-data relay apparatus 30a is "same. same. same. different" with respect to the IP address "1.2.1.3" of the request source terminal (the terminal 10aa), so that the point of the address priority is "5" as shown in FIG. 22. The IP address "1.2.1.2" of the extended-data relay apparatus 30a is "same. different. different. different" with respect to the IP address "1.3.2.4" of the destination terminal (the terminal 10db), so that the point of the address priority is "1". The IP address "1.2.2.2" of the extended-data relay apparatus 30b is "same. same. different. different" with respect to the IP address "1.2.1.3" of the request source terminal (the terminal 10aa), so that the point of the address priority is "3". The IP address "1.2.2.2" of the extended-data relay apparatus 30b is "same. different. same. different" with respect to the IP address "1.3.2.4" of the destination terminal (the terminal 10db), so that the point of the address priority is "1". The IP address "1.3.2.2" of the extended-data relay apparatus 30d is "same. different. different. different" with respect to the IP address "1.2.1.3" of the request source terminal (the terminal 10aa), so that the point of the address priority is "1". The IP address "1.3.2.2" of the extended-data relay apparatus 30d is "same. same. same. different" with respect to the IP address "1.3.2.4" of the destination terminal (the terminal 10db), so that the point of the address priority is "5".

Referring back to FIG. 21, a priority determining unit 57d searches through the transmission-rate priority management table (see FIG. 15) of the priority management DB 5006 based on the maximum data transmission rate of each extended-data relay apparatus 30 managed by the extended-data relay apparatus management DB 5001 (see FIG. 9), and determines point of the transmission-rate priority for each of the extended-data relay apparatuses (30a, 30b, and 30d) that are narrowed down by the primary narrowing-down process at Step S46-2 (Step S46-5). In the embodiment, as shown in FIG. 9, the maximum data transmission rate of the extended-data relay apparatus 30a is 100 (Mbps), so that the transmission-rate priority is 3 points with reference to the transmission-rate priority shown in FIG. 15. Similarly, the maximum data transmission rate of the extended-data relay apparatus 30b is 1000 (Mbps) by calculation, so that the transmission-rate priority is 5 points. Similarly, the maximum data transmission rate of the extended-data relay apparatus 30d is 10 (Mbps) by calculation, so that the transmission-rate priority is 1 point.

The primary selecting unit 56c selects top two extended-data relay apparatuses 30 in order from the highest point from among the total points, in which a higher point between the points of the address priority with respect to the terminals (10aa and 10db) and the point of the transmission-rate priority are combined, for each extended-data relay apparatus (30*a*, 30*b*, and 30*d*) (Step S46-6). In the embodiment, as shown in FIG. 22, the total points for the respective extended-data relay apparatus IDs (111*a*, 111*b*, and 111*d*) are "8", "8", and "5", so that the extended-data relay apparatus 30*a* with the extended-data relay apparatus ID "111*a*" and the extended-data relay apparatus 30*b* with the extended-data relay apparatus ID "111*b*" are selected.

When the narrowing-down process at Step S46 as above is complete, the transmitting-receiving unit 51 shown in FIG. 4 transmits, to the destination terminal (the terminal 10*db*), extended-data relay apparatus narrowed-down information for notifying the number of the narrowed-down extended-data relay apparatuses 30 (Step S47). The extended-data relay apparatus narrowed-down information contains the number of the extended-data relay apparatuses 30 narrowed down at Step S46, i.e., "2", the terminal ID "01*aa*" of the request source terminal (the terminal 10*aa*), and the selection session ID "se1". Accordingly, the terminal 10*db* can recognize the number of the extended-data relay apparatuses 30, a terminal 10 that has requested start of a teleconference in the session with the selection session ID "se1", and the IP address "1.1.1.2" of the management system 50 that is a transmission source of the extended-data relay apparatus narrowed-down information.

The terminal 10*db* transmits reception complete information indicating that the reception of the extended-data relay apparatus narrowed-down information is complete, from the transmitting-receiving unit 11 to the management system 50 via the communication network 2 (Step S48). The reception complete information contains the session ID "se1". Therefore, the management system 50 can recognize that the notification of the number of the extended-data relay apparatuses, which is performed by the session with the session ID "se1", is complete and the IP address "1.3.2.4" of the destination terminal (the terminal 10*db*) that is a transmission source.

With reference to FIG. 23, explanation will be given of a process performed by the destination terminal (the terminal 10*aa*) for selecting the extended-data relay apparatus 30. Before starting a teleconference, the management system 50 transmits, to each of the extended-data relay apparatuses (30*a* and 30*b*) that are narrowed down at Step S46, prior relay request information for requesting relay in advance (Steps S61-1 and S61-2). The prior relay request information contains the session ID "se1", the IP address "01*aa*" of the request source terminal (the terminal 10*aa*), and the IP address "01*db*" of the destination terminal (the terminal 10*db*). Therefore, the extended-data relay apparatuses (30*a* and 30*b*) can recognize the selection session, the request source terminal, the destination terminal, and the IP address "1.1.1.2" of the management system 50 that is a transmission source of the prior relay request information.

Each of the extended-data relay apparatuses (30*a* and 30*b*) transmits, from the transmitting-receiving unit 31 to the request source terminal (the terminal 10*aa*) recognized at Steps S61-1 and S61-2 via the communication network 2, prior transmission request information indicating a request for transmitting the prior transmission information containing ping (Packet Internet Groper), which will be described below, to each of the extended-data relay apparatuses (30*a* and 30*b*) that are own apparatuses before start of the teleconference (Steps S62-1 and S62-2). The prior transmission information contains the session ID "se1". Therefore, the request source terminal (the terminal 10*aa*) can recognize that the prior transmission information is transmitted to each of the extended-data relay apparatuses (30*a* and 30*b*), as well as the IP addresses ("1.2.1.2" and "1.2.2.2") of the extended-data relay apparatuses (30*a* and 30*b*) that are the transmission sources of the prior transmission request information.

The management system 50 does not directly notify the request source terminal (the terminal 10*aa*) of the IP address of the destination terminal (the terminal 10*db*), but notifies the extended-data relay apparatus 30*a* of the IP address of the destination terminal (the terminal 10*db*) at Step S61-1 as above, and then the extended-data relay apparatus 30*a* requests the request source terminal (the terminal 10*aa*) to transmit the prior transmission request information to the own terminal (the extended-data relay apparatus 30*a*). The above process is performed in order to ensure the security by not notifying each terminal 10 of the IP addresses of the other terminals 10.

The request source terminal (the terminal 10*aa*) transmits the prior transmission information from the transmitting-receiving unit 11 to the extended-data relay apparatuses (30*a* and 30*b*) via the communication network 2 (Steps S63-1 and S63-2). The prior transmission information is transmitted to each of the extended-data relay apparatuses (30*a* and 30*b*) prior to transmission of image data and audio data, as a substitute for the image data and the audio data, and is used to measure time needed from transmission by the request source terminal (the terminal 10*aa*) to the reception by the destination terminal (the terminal 10*db*). The prior transmission information contains ping for confirming that the request source terminal (the terminal 10*aa*), the extended-data relay apparatuses (30*a* and 30*b*), and the destination terminal (the terminal 10*db*) are communicably connected to each other, the transmission date and time at which the prior transmission information is transmitted by the request source terminal (the terminal 10*aa*), and the session ID "se1". Accordingly, each of the extended-data relay apparatuses (30*a* and 30*b*) can recognize that the prior transmission information has been transmitted by the session with the selection session ID "se1", and can also recognize the IP address "1.2.1.3" of the request source terminal (the terminal 10*aa*) that is a transmission source of the prior transmission information.

Each of the extended-data relay apparatuses (30*a* and 30*b*) relays the prior transmission information to the IP address "1.3.2.4" of the destination terminal (the terminal 10*db*), which is contained in the prior relay request information received at Steps S61-1 and S61-2 as above (Steps S64-1 and S64-2). Accordingly, the destination terminal (the terminal 10*db*) can recognize that the prior transmission information has been transmitted by the session with the session ID "se1", and can also recognize the IP addresses ("1.2.1.2" and "1.2.2.2") of the extended-data relay apparatuses (30*a* and 30*b*) that are transmission sources (relay sources) of the prior transmission information.

The ultimate narrowing-down unit 16 of the destination terminal (the terminal 10*db*) ultimately narrows down to one extended-data relay apparatus 30 for relaying image data and audio data for a teleconference, based on the prior transmission information (Step S65).

With reference to FIGS. 4 and 24, the process at Step S65 will be described in detail below. The measuring unit 16*a* of the ultimate narrowing-down unit 16 shown in FIG. 4 measures the reception date and time at which the transmitting-receiving unit 11 of the terminal 10*db* has received the prior transmission information for each prior transmission information relayed by each extended-data relay apparatus (30*a* and 30*b*) (Step S65-1). The calculating unit 16*b* calculates time needed from transmission to reception of each prior transmission information based on a difference between the reception date and time and the transmission date and time contained in the prior transmission information, for each prior transmission information for which the reception date and time is calculated as above (Step S65-2). The ultimate selecting unit 16c determines whether all pieces of the prior transmission information as many as "two", which is the number of the extended-data relay apparatuses 30 to be used for relay, have been received in the session with the session ID "se1" (Step S65-3). When all of the pieces of the information are not received (NO), the ultimate selecting unit 16c determines whether a predetermined time (in this example, 1 minute) has elapsed after the terminal 10db received the prior transmission information (Step S65-4). When the predetermined time has not passed (NO), process control returns to Step S65-1. On the other hand, when all of the pieces of the information are received (YES) at Step S65-3, or when the predetermined time has passed (YES) at Step S65-4, the ultimate selecting unit 16c selects one extended-data relay apparatus 30 that has relayed the prior transmission information in the shortest needed time of any needed time calculated by the calculating unit 16b (Step S65-5). In the embodiment, an example is illustrated in which the extended-data relay apparatus 30a is selected assuming that the time needed from transmission to reception of the prior transmission information relayed by the extended-data relay apparatus 30a is shorter than that of the prior transmission information relayed by the extended-data relay apparatus 30b.

In the embodiment, the extended-data relay apparatus 30a is narrowed down by the destination terminal (the terminal 10db) side. However, the present invention is not limited to this example. It is possible to cause the request source terminal (the terminal 10aa) side or the management system 50 side to ultimately narrow down to one extended-data relay apparatus 30a by causing the destination terminal (the terminal 10db) to transmit all pieces of needed time information, which indicates time needed from transmission to reception of the prior transmission information, to the request source terminal (the terminal 10aa) or the management system 50.

The destination terminal (the terminal 10db) transmits selection information indicating that the extended-data relay apparatus 30a has been selected, from the transmitting-receiving unit 11 to the management system 50 via the communication network 2 (Step S66). The selection information contains the session ID "se1" and the extended-data relay apparatus ID "111a" of the selected extended-data relay apparatus 30a. Therefore, the management system 50 can recognize that the extended-data relay apparatus 30a has been selected by the execution of the session with the session ID "se1", and can also recognize the IP address "1.3.2.4" of the terminal 10db that is a transmission source of the selection information.

The session managing unit 57 of the management system 50 stores and manages the extended-data relay apparatus ID "111a" of the extended-data relay apparatus 30a, which is singly selected in the end, in the field portion corresponding to the extended-data relay apparatus ID in the record containing the session ID "se1" in the session management table of the session management DB 5005 (see FIG. 13) (Step S67). The extended-data relay requesting unit 61 of the management system 50 transmits relay-start request information indicating a request for start of relay to the extended-data relay apparatus 30a via the transmitting-receiving unit 51 (Step S68). The relay-start request information contains the IP addresses ("1.2.1.3" and "1.3.2.4") of the request source terminal (the terminal 10aa) and the destination terminal (the terminal 10db) that are used for relay. Therefore, the extended-data relaying unit 36 of the extended-data relay apparatus 30a transmits extended-data transmission request information, which contains the IP address of the extended-data relay apparatus 30a and which indicates a request for transmission of the extended data, to the request source terminal (the terminal 10aa) and the destination terminal (the terminal 10db) (Steps S69-1 and S69-2). Each of the request source terminal (the terminal 10aa) and the destination terminal (the terminal 10db) transmits the extended data to the extended-data relay apparatus 30a. The extended-data relaying unit 36 of the extended-data relay apparatus 30a relays the extended data received from one of the terminals to the other of the terminals, so that a session for communicating the extended data is established (Step S70).

At Step S47, along with the transmission of the extended-data relay apparatus narrowed-down information from the management system 50 to the destination terminal (the terminal 10db), the destination terminal (the terminal 10db) side performs the process for selecting the extended-data relay apparatus (Step S65) at Steps S48 to S64-1 and S64-2. However, the present invention is not limited to this example. For example, at Step S47, the management system 50 can transmit the extended-data relay apparatus narrowed-down information to the request source terminal (the terminal 10aa) so that the transmission side and the reception side for communicating the information are switched between the request source terminal (the terminal 10aa) and the destination terminal (the terminal 10db) from subsequent step to Steps S64-1 and S64-2. Accordingly, the request source terminal (the terminal 10aa) can perform the process for selecting the extend-data relay apparatus as a substitute at Step S65 described above, and can also transmit the selection information as a substitute at Step S66 described above.

With reference to FIGS. 4 and 25, explanation will be given of a process for transmitting and receiving extended data for performing a teleconference between the request source terminal (the terminal 10aa) and the destination terminal (the terminal 10db). In a process for transmitting image data and audio data in one direction from the terminal 10aa to the terminal 10db and a process for transmitting image data and audio data in a reverse direction from the terminal 10db to the terminal 10aa, the same processes are performed for transmitting and receiving the image data and the audio data and for detecting delay time, and therefore, explanation will be given of the communication in one direction and explanation of the communication in the reverse direction will be not given.

The encoding unit of the request source terminal (the terminal 10aa) performs encoding on image data of an object photographed by the imaging unit 14a and audio data of audio input by the audio input unit 15a, by using the codec stored in the storage unit 1000. Specifically, the encoding unit 20 encodes the image data into a single piece of base data and two pieces of extended data (the extended data 1 and the extended data 2). The request source terminal (the terminal 10aa) transmits the extended data among the pieces of encoded data from the transmitting-receiving unit 11 to the extended-data relay apparatus 30a via the communication network 2 (Step S81). Accordingly, the transmitting-receiving unit 31 of the extended-data relay apparatus 30a receives the two pieces of the extended data (the extended data 1 and the extended data 2). The data-quality confirming unit 33 searches through the changed-quality management DB 3001 (see FIG. 8) by using the IP address "1.3.2.4" of the destination terminal (the terminal 10db) as a search key, and extracts corresponding image quality of the image data to be relayed (the extended data to be relayed), thereby confirming the quality of the image of the image data to be relayed (Step S82). In the embodiment, the confirmed image quality of the image of the image data is "high image quality" and the extended data to be relayed is not changed, so that the data as it is (the extended data 1 and the extended data 2) is transmitted to the destination terminal (the terminal 10*db*) (Step S83). Accordingly, the transmitting-receiving unit 11 of the destination terminal (the terminal 10*db*) receives the extended data (the extended data 1 and the extended data 2). The decoding unit 21 of the destination terminal (the terminal 10*db*) decodes the image data of high image quality by using the extended data (the extended data 1 and the extended data 2) and the base data that is separately received from the base-data relay apparatus 430. The decoding unit 21 of the destination terminal (the terminal 10*db*) decodes the audio data that is separately received from the base-data relay apparatus 430. Accordingly, the image display control unit 14*b* displays the image of the image data on the display 120 and the audio output unit 15*b* outputs audio based on the audio data.

The delay detecting unit 17 of the terminal 10*db* detects extended-data delay time taken to receive the extended data by the transmitting-receiving unit 11, for each predetermined time (for example, for one second) (Step S84). In the embodiment, an example will be described in which the extended-data delay time is 200 (ms).

The transmitting-receiving unit 11 of the destination terminal (the terminal 10*db*) transmits the extended-data delay information indicating the extended-data delay time "200 (ms)" to the management system 50 via the communication network 2 (Step S85). Accordingly, the management system 50 can recognize the extended-data delay time and the IP address "1.3.2.4" of the terminal 10*db* that is a transmission source of the extended-data delay information.

The extended-data-delay-time managing unit 60 of the management system 50 searches through the terminal management DB 5003 (see FIG. 11) by using the IP address "1.3.2.4" of the destination terminal (the terminal 10*db*) as a search key, and extracts a corresponding terminal ID "01db". Further, the extended-data-delay-time managing unit 60 stores and manages the extended-data delay time "200 (ms)" indicated by the extended-data delay information in a field portion corresponding to the extended-data delay time in the record for the terminal ID "01db" in the session management table (see FIG. 13) of the session management DB 5005 (Step S86).

The quality determining unit 58 searches through the quality management DB 5007 (see FIG. 16) by using the extended-data delay time "200 (ms)" as a search key, and extracts corresponding image quality "medium image quality" of the image data, thereby determining the image quality as "medium image quality" (Step S87).

The transmitting-receiving unit 51 searches through the extended-data relay apparatus management DB 5001 (see FIG. 9) by using, as a search key, the extended-data relay apparatus ID "111a" associated with the terminal ID "01db" in the session management table (see FIG. 13) of the session management DB, and extracts the IP address "1.2.1.2" of a corresponding extended-data relay apparatus 30*a* (Step S88). The transmitting-receiving unit 51 transmits, to the extended-data relay apparatus 30*a* via the communication network 2, quality information indicating the image quality "medium image quality" of the image data determined at Step S87 (Step S89). The quality information contains the IP address "1.3.2.4" of the destination terminal (the terminal 10*db*), which is used as the search key at Step S86. Accordingly, the changed-quality managing unit 34 of the extended-data relay apparatus 30*a* stores and manages the IP address "1.3.2.4" of the terminal 10 as a transmission source (in this example, the destination terminal (the terminal 10*db*)) and the image quality of "medium image quality" of the image data to be relayed, in the changed-quality management DB 3001 (see FIG. 8) in an associated manner (Step S90).

The terminal 10*aa* transmits, similarly to Step S81 described above, the extended data formed of two pieces of extended data (the extended data 1 and the extended data 2) to the extended-data relay apparatus 30*a* (Step S91). Accordingly, similarly to Step S88 described above, the data-quality confirming unit 33 of the extended-data relay apparatus 30*a* searches through the changed-quality management DB 3001 (see FIG. 8) by using the IP address "1.3.2.4" of the destination terminal (the terminal 10*db*) as a search key, and extracts corresponding image quality "medium image quality" of the image data to be relayed, thereby confirming the quality of the image of the image data to be relayed (Step S92). In the embodiment, the confirmed image quality of the image data is "medium image quality", which is lower than the image quality of "high image quality" of the image data received by the transmitting-receiving unit 31, so that the data-quality changing unit 35 reduces the extended data to be relayed from both of the extended data 1 and the extended data 2 to only the extended data 1 in order to change the quality of the image of the image data (Step S93). The transmitting-receiving unit 31 transmits the extended data 1 to the terminal 10*db* via the communication network 2 (Step S94).

In this manner, when delay occurs in receiving image data by the destination terminal (the terminal 10*db*), the extended-data relay apparatus 30*a* changes the quality of an image, so that it is possible not to give a feeling of strangeness to people participating in a teleconference.

Main Advantages of the Embodiment

According to the embodiment described above, a base-data relay system, which includes a plurality of base-data relaying units and a selecting unit that selects one of the base-data relaying units for each communication between terminals, can relay base data that is necessary for reproducing video or audio. Besides, an extended-data relay apparatus can relay extended data for improving the quality of the video or the audio. Therefore, even when the extended data cannot be relayed due to a failure that occurs in the extended-data relay apparatus, because the base-data relay apparatus can relay the base data, the communication between the terminals can be maintained.

According to the embodiment, the connection number as the number of terminals that transmit base data is managed for each base-data relay apparatus, and a base-data relay apparatus used for relaying the base data is selected from the base-data relay apparatuses having the smallest connection number. Because the amount of the base data transmitted by each terminal is approximately the same, a load on each base-data relay apparatus can be made approximately uniform by selecting a base-data relay apparatus in the above manner.

According to the embodiment, the base-data relay apparatus requests a terminal to transmit base data, and relays the base data, which has been transmitted in response to the request, to a terminal being a destination. The extended-data relay apparatus requests a terminal to transmit extended data, and relays the extended data, which has been transmitted in response to the request, to the terminal being the destination. Accordingly, it is possible to relay the base data by the base-data relay apparatus with high availability and relay the extended data by the extended-data relay apparatus. Therefore, even when a failure occurs in the extended-data relay apparatus and the extended data cannot be relayed, the base data can be relayed by the base-data relay apparatus. As a result, communication between terminals can be maintained.

According to the embodiment, the management system requests the extended-data relay system selected from a plurality of extended-data relay apparatuses to start relay of the extended data, and requests a predetermined base-data relay system to start relay of the base data. Because the amount of base data is generally smaller than the amount of extended data, even when the predetermined base-data relay system is used, a large load is not applied to the base-data relay system. Besides, the extended data with a large data amount and which is likely to be delayed in transmission is relayed by the extended-data relay apparatus that is selected depending on the characteristics such as the transmission rate, so that the quality of the communication can be improved.

According to the embodiment, the terminal 10 encodes at least one of image data and audio data into base data and extended data, transmits the encoded base data to the base-data relay system, and transmits the encoded extended data to the extended-data relay apparatus. Accordingly, the base data can be relayed by the base-data relay apparatus with high availability and the extended data can be relayed by the extended-data relay apparatus. Therefore, even when a failure occurs in the extended-data relay apparatus and the extended data cannot be relayed, the base data can be relayed by the base-data relay apparatus. As a result, communication between terminals can be maintained.

According to the embodiment, even when the environment of the communication network 2, such as the IP address of the extended-data relay apparatus 30, can be acquired, it is difficult to acquire the environment of the Internet 2$i$. Therefore, a plurality of the extended-data relay apparatus 30 is narrowed down to two or more extended-data relay apparatuses for relaying image data and audio data, based on available information about the environment. Thereafter, before the image data or the audio data is actually transmitted and received between the terminals 10, the prior transmission information is transmitted and received as a substitute for the image data or the audio data. As a result the extended-data relay apparatuses 30 can be narrowed down to one extended-data relay apparatus that can actually relay the prior transmission information at the fastest speed.

More specifically, extended-data relay apparatuses with IP addresses that are the closest and the second closest to any of the IP addresses of the terminals 10 are selected, and therefore, potentials can be narrowed down to two or more extended-data relay apparatuses 30 to be ultimately used. Thereafter, prior transmission information is actually transmitted and received between the request source terminal and the destination terminal via the potential extended-data relay apparatuses 30. Consequently, it is possible to select one extended-data relay apparatus 30 that has relayed the prior transmission information in the shortest time needed for transmission and reception from among the two or more potential extended-data relay apparatuses 30. Therefore, it is possible to perform transmission and reception of image data and audio data at the highest quality possible under the current environment of the communication network 2.

According to the embodiment, when the extended-data relay apparatuses 30 are narrowed down, not only the extended-data relay apparatus 30 having the IP address closest to the IP address of the terminal 10 that performs a teleconference is selected with priority, but also two or more extended-data relay apparatuses 30 are selected by taking into account the maximum data transmission rate of each of the extended-data relay apparatuses 30. Therefore, it is possible to narrow the potential extended-data relay apparatuses 30 down in accordance with the current environment of the communication network 2.

According to the embodiment, when the extended-data relay apparatuses 30 are narrowed down, an extended-data relay apparatus is selected from among the extended-data relay apparatuses 30 of which operating states are online. Therefore, it is possible to narrow the extended-data relay apparatuses 30 down in accordance with the current environment of the communication network 2.

Additional Explanation of the Embodiment

The management system 50 and the program providing system 90 of the embodiment may be made up of a single computer, or may be divided into each unit (function or means) and made up of a plurality of computers arbitrarily allocated to each unit. When the program providing system 90 is made up of a single computer, programs transmitted by the program providing system 90 may be made up of a plurality of modules for transmission or may not be divided for transmission. When the program providing system 90 is made up of a plurality of computers, a plurality of modules may be transmitted from each computer in a divided state.

The base-data relay system 40 of the embodiment may be made up of a single computer, or may be divided into each unit (function or means) and made up of a plurality of computers arbitrarily allocated to each unit. When the base-data relay system 40 is made up of a single computer, programs transmitted by the base-data relay system 40 may be made up of a plurality of modules for transmission or may not be divided for transmission. When the base-data relay system 40 is made up of a plurality of computers, a plurality of modules may be transmitted from each computer in a divided state.

The extended-data relay apparatus 30 of the embodiment may be made up of a single computer, or may be divided into each unit (function or means) and made up of a plurality of computers arbitrarily allocated to each unit. When the extended-data relay apparatus 30 is made up of a single computer, programs transmitted by the extended-data relay apparatus 30 may be made up of a plurality of modules for transmission or may not be divided for transmission. When the extended-data relay apparatus 30 is made up of a plurality of computers, a plurality of modules may be transmitted from each computer in a divided state.

A recording medium that stores therein the terminal program, the extended-data-relay-apparatus program, and the transmission management program according to the embodiment, the HD 204 that stores therein these programs, and the program providing system 90 that includes the HD 204 may be used as a program product within a country or out of the country when the terminal program, the extended-data-relay-apparatus program, and the transmission management program are provided for use by a user or the like.

In the embodiment described above, the resolution of an image of image data is managed as an example of the quality of the image of the image data to be relayed by the extended-data relay apparatus 30, based on the changed-quality management table shown in FIG. 8 and the quality management table shown in FIG. 16. However, the present invention is not limited to this example. For example, the depth of the image quality of the image data, sampling frequency of audio of the audio data, or a bit length of audio of the audio data may be managed as other examples of the quality.

In FIGS. 9, 11, and 13, the reception date and time is managed. However, the present invention is not limited to this example and it is sufficient to manage at least reception time among the reception date and time.

In the embodiment described above, the IP address of the base-data relay apparatus is managed as shown in FIG. 7, the IP address of the extended-data relay apparatus is managed as shown in FIG. 9, and the IP address of a terminal is managed as shown in FIG. 11. However, the present invention is not limited to this example. For example, FQDN (Fully Qualified Domain Name) may be managed as long as it can serve as the extended-data relay apparatus identification information for identifying the extended-data relay apparatus 30 in the communication network 2 or the terminal identification information for identifying the terminal 10 on the communication network 2. In this case, an IP address corresponding to FQDN is acquired by a known DNS (Domain Name Server). "The extended-data relay apparatus identification information for identifying the extended-data relay apparatus 30 on the communication network 2" may be described as "extended-data relay apparatus connection destination information indicating a connection destination for the extended-data relay apparatus 30 on the communication network 2" or "extended-data relay apparatus destination information indicating a destination for the extended-data relay apparatus 30 on the communication network 2". Similarly, "the terminal identification information for identifying the terminal 10 on the communication network 2" may be referred to as "terminal connection destination information indicating connection destination for the terminal 10 on the communication network 2" or "terminal destination information indicating destination for the terminal 10 on the communication network 2".

In the embodiment, a teleconference system is explained as an example of the transmission system 1. However, the present invention is not limited to this example. For example, the present invention may be applied to an IP (Internet Protocol) phone or a telephone system of an Internet phone. The transmission system 1 may be a car navigation system. In this case, one of terminals 30 corresponds to a car navigation apparatus installed in a car, and the other of the terminals 30 corresponds to a management terminal or a management server in a management center for managing the car navigation or a car navigation apparatus installed in another car.

In the embodiment, an example is explained in which the base-data relay apparatus 430 requests the terminal 10 to transmit base data or the like, and the terminal 10 transmits the base data to the base-data relay apparatus 430 in response to the request. However, the present invention is not limited to this example. For example, it is possible to transmit the IP address of the selecting apparatus 410 of the base-data relay system 40 from the management system 50 to the terminal 10 and cause the terminal 10 to request the base-data relay system 40 to relay the base data based on the IP address.

In the embodiment, an example is explained in which the selecting unit 412 selects a base-data relay apparatus when communication is started between terminals. However, the present invention is not limited to this example. For example, it is possible to select a new base-data relay apparatus when the base-data relay apparatus cannot relay base data because of a failure in the base-data relay apparatus or maintenance of the base-data relay apparatus, and continuously maintain the session for communicating the base data. Accordingly, even when a failure occurs in the base-data relay apparatus and base data cannot be relayed, it is possible to relay the base data by the base-data relay apparatus that is newly-selected by the selecting apparatus. As a result, the communication between the terminals can be maintained.

In the embodiment, image data and audio data are explained as examples of contents data. However, the present invention is not limited to this example, and may be applied to touch data. In this case, sense of touch by a user using one terminal is transmitted to the other terminal. Further, the contents data may be smell data. In this case, scent (smell) on one terminal is transmitted to the other terminal. It is sufficient that the contents data is at least one of image data, audio data, touch data, and smell data.

In the embodiment, an example is explained in which a teleconference is performed by the transmission system 1. However, the present invention is not limited to this example. For example, the present invention may be used for a meeting, a general conversation between family members or friends, or outputting of information in one direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission system that transmits base data, which is necessary for reproducing image and audio, and extended data, which is used for improving quality of the image and the audio, via a communication network between transmission terminals, the transmission system comprising:
   a first selecting circuit that selects one base-data relaying apparatus from among a plurality of base-data relaying apparatuses, the one base-data relaying apparatus relaying the base data transmitted from a first transmission terminal, being a transmission source, to a second transmission terminal being a transmission destination; and
   a second selecting circuit that selects an extended-data relaying apparatus being different from the base-data relaying apparatus, the extended-data relaying apparatus relaying the extended data transmitted from the first transmission terminal to the second transmission terminal,
   wherein, on the basis of a start request information of communication with the second transmission terminal transmitted from the first transmission terminal, sessions for communicating the base data are established respectively among the one base-data relaying apparatus selected by the first selecting circuit, the first transmission terminal, and the second transmission terminal, and sessions for communicating the extended data are established among the extended-data relaying apparatus, the first transmission terminal, and the second transmission terminal.

2. The transmission system according to claim 1, further comprising:
   a connection-number managing circuit that manages base-data relaying apparatus identification information for identifying each of the base-data relaying apparatuses, and a connection number indicating a number of transmission terminals that transmit the base data to a base-data relaying apparatus identified based on the base-data relaying apparatus identification information, wherein
   the first selecting circuit selects a base-data relaying apparatus of which the connection number is the smallest from among the plurality of base-data relaying apparatuses.

3. The transmission system according to claim 1, wherein
   the base-data relaying apparatus transmits information indicating a request for transmission of base data to the source transmission terminal, and relays base data transmitted in response to the request to the destination transmission terminal, and
   the extended-data relaying apparatus transmits information indicating a request for transmission of extended data to the source transmission terminal, and relays extended data transmitted in response to the request to the destination transmission terminal.

4. The transmission system according to claim 1, further comprising:
- a plurality of the extended-data relay apparatuses;
- an extended-data relay requesting circuit that requests an extended-data relay apparatus selected from among the plurality of the extended-data relay apparatuses to start relaying the extended data; and
- a base-data relay requesting circuit that requests a predetermined base-data relay apparatus to start relaying the base data.

5. The transmission system according to claim 1, further comprising:
- a transmission terminal that includes
  - an encoder that encodes at least one of image data and audio data into the base data and the extended data; and
  - a transmitter that transmits the encoded base data to the one base-data relay apparatus, and transmits the encoded extended data to the extended-data relay apparatus.

6. A transmitting method for a transmission system that transmits and receives base data, which is necessary for reproducing image and audio, and extended data, which is used for improving quality of the image and the audio, via a communication network between transmission terminals, the transmission system including a first selecting circuit and a second selecting circuit, the transmitting method comprising:
- selecting, by the first selecting circuit, one base-data relaying apparatus from among a plurality of base-data relaying apparatuses, the one base-data relaying apparatus relaying the base data transmitted from a first transmission terminal, being a transmission source, to a second transmission terminal being a transmission destination; and
- selecting, by a second selecting circuit, an extended-data relaying apparatus being different from the base-data relaying apparatus, the extended-data relaying apparatus relaying the extended data transmitted from the first transmission terminal to the second transmission terminal,
- wherein, on the basis of a start request information of communication with the second transmission terminal transmitted from the first transmission terminal, sessions for communicating the base data are established respectively among the one base-data relaying apparatus selected by the first selecting circuit, the first transmission terminal, and the second transmission terminal, and sessions for communicating the extended data are established among the extended-data relaying apparatus, the first transmission terminal, and the second transmission terminal.

7. The transmitting method according to claim 6, wherein the transmission system further includes a connection-number managing circuit that manages base-data relaying apparatus identification information for identifying each of the base-data relaying apparatuses, and a connection number indicating a number of transmission terminals that transmit the base data to a base-data relaying apparatus identified based on the base-data relaying apparatus identification information, the method further comprising:
- selecting, by the first selecting circuit, a base-data relaying apparatus of which the connection number is the smallest from among the plurality of base-data relaying apparatuses.

8. The transmitting method according to claim 6, further comprising:
- transmitting, by the one base-data relaying apparatus, information indicating a request for transmission of base data to the source transmission terminal,
- relaying, by the one base-data relaying apparatus, base data transmitted in response to the request to the destination transmission terminal,
- transmitting, by the extended-data relaying apparatus, information indicating a request for transmission of extended data to the source transmission terminal, and
- relaying, by the extended-data relaying apparatus, extended data transmitted in response to the request to the destination transmission terminal.

9. The transmitting method according to claim 6, wherein the transmission system further includes a plurality of the extended-data relay apparatuses, an extended-data relay requesting circuit; and a base-data relay requesting circuit, the transmitting method further comprising:
- requesting, by the extended-data relay requesting circuit, an extended-data relay apparatus selected from among the plurality of the extended-data relay apparatuses to start relaying the extended data; and
- requesting, by the base-data relay requesting circuit, a predetermined base-data relay apparatus to start relaying the base data.

10. The transmitting method according to claim 6, wherein the transmission system further includes a transmission terminal that includes an encoder and a transmitter, the transmitting method further comprising:
- encoding, by the encoder, at least one of image data and audio data into the base data and the extended data;
- transmitting, by the transmitter, the encoded base data to the one base-data relay apparatus; and
- transmitting, by the transmitter, the encoded extended data to the extended-data relay apparatus.

11. A non-transitory computer-readable medium storing program instructions which, when executed by processing circuitry, cause the processing circuitry to perform a transmitting method for a transmission system that transmits and receives base data, which is necessary for reproducing image and audio, and extended data, which is used for improving quality of the image and the audio, via a communication network between transmission terminals, the transmission system including a first selecting circuit and a second selecting circuit, the transmitting method comprising:
- selecting, by the first selecting circuit, one base-data relaying apparatus from among a plurality of base-data relaying apparatuses, the one base-data relaying apparatus relaying the base data transmitted from a first transmission terminal, being a transmission source, to a second transmission terminal being a transmission destination; and
- selecting, by a second selecting circuit, an extended-data relaying apparatus being different from the base-data relaying apparatus, the extended-data relaying apparatus relaying the extended data transmitted from the first transmission terminal to the second transmission terminal,
- wherein, on the basis of a start request information of communication with the second transmission terminal transmitted from the first transmission terminal, sessions for communicating the base data are established respectively among the one base-data relaying apparatus selected by the first selecting circuit, the first transmission terminal, and the second transmission terminal, and sessions for communicating the extended data are established among the extended-data relaying apparatus, the first transmission terminal, and the second transmission terminal.

* * * * *